US012628797B2

(12) United States Patent
Salyer et al.

(10) Patent No.: US 12,628,797 B2
(45) Date of Patent: May 19, 2026

(54) CONVERTIBLE CAT TRACK TOY

(71) Applicant: The Kyjen Company, LLC, Centennial, CO (US)

(72) Inventors: Danielle Salyer, Denver, CO (US); Jeffrey Paris, Los Angeles, CA (US)

(73) Assignee: The Kyjen Company, LLC, Centennial, CO (US)

( * ) Notice: Subject to any disclaimer, the term of this patent is extended or adjusted under 35 U.S.C. 154(b) by 0 days.

(21) Appl. No.: 18/607,216

(22) Filed: Mar. 15, 2024

(65) Prior Publication Data

US 2024/0306605 A1 Sep. 19, 2024

Related U.S. Application Data

(60) Provisional application No. 63/452,973, filed on Mar. 17, 2023.

(51) Int. Cl.
A01K 15/02 (2006.01)

(52) U.S. Cl.
CPC .................................. A01K 15/025 (2013.01)

(58) Field of Classification Search
CPC .............................. A63H 15/08; A01K 15/025
USPC .................................................. 446/170, 168
See application file for complete search history.

(56) References Cited

U.S. PATENT DOCUMENTS

| | | | | |
|---|---|---|---|---|
| 1,150,761 A | * | 8/1915 | Hartman | .................. A63F 7/044 |
| | | | | 446/168 |
| 4,553,754 A | * | 11/1985 | Wiggs | .................... A63F 9/0857 |
| | | | | 273/153 S |

| | | | | |
|---|---|---|---|---|
| 4,722,299 A | * | 2/1988 | Mohr | ................... A01K 15/025 |
| | | | | 119/707 |
| 4,861,309 A | * | 8/1989 | Williams | .............. A63F 7/3622 |
| | | | | 446/168 |
| 5,544,623 A | * | 8/1996 | Udelle | ................. A01K 15/025 |
| | | | | 119/706 |
| D453,240 S | | 1/2002 | Simon | |
| 6,405,682 B1 | | 6/2002 | Simon | |
| 6,857,632 B2 | * | 2/2005 | Tanner | .................. A63F 9/0857 |
| | | | | 273/153 S |
| 7,147,399 B2 | * | 12/2006 | Viscount | .............. A63C 19/062 |
| | | | | 403/348 |
| 7,152,862 B1 | | 12/2006 | Chiu | |
| 10,973,207 B1 | * | 4/2021 | Ettehadieh | ............... A01K 5/00 |
| 2009/0314221 A1 | * | 12/2009 | Wang | ................... A01K 15/025 |
| | | | | 119/707 |
| 2012/0318210 A1 | * | 12/2012 | Anderson | ............ A01K 15/025 |
| | | | | 119/710 |
| 2019/0373859 A1 | * | 12/2019 | Bentz | ................... A01K 15/025 |
| 2022/0295744 A1 | * | 9/2022 | Wilhelm | .............. B29C 66/727 |
| 2024/0357998 A1 | * | 10/2024 | Axelrod | .............. A01K 15/025 |
| 2024/0357999 A1 | * | 10/2024 | Salyer | ................. A01K 15/026 |

* cited by examiner

*Primary Examiner* — Christopher D Hutchens

(74) *Attorney, Agent, or Firm* — Lempia Summerfield Katz LLC

(57) ABSTRACT

A pet toy includes a first half and a second half rotatably coupled to the first half. In a first arrangement, the first half and the second half collectively form two or more independent pathways. Each of the two or more independent pathways may be configured to receive and convey an object. In a second arrangement, the first half and the second half collectively form a single pathway configured to receive and convey the object.

20 Claims, 21 Drawing Sheets

471
473
472
470
473
472
473
472
470
471
473
472

550

CONVERTIBLE CAT TRACK TOY

This application claims the benefit of priority to U.S. Provisional Application entitled "CONVERTIBLE CAT TRACK TOY" filed Mar. 17, 2023, and assigned U.S. Ser. No. 63/452,973 the entire disclosure of which is hereby expressly incorporated by reference.

BACKGROUND OF THE DISCLOSURE

Field of the Disclosure

The disclosure relates generally to pet toys, and more specifically, to an interactive pet toy configured to mentally stimulate pets.

Brief Description of Related Technology

Generally, a wide variety of pet toys are available to keep pets entertained. For example, pet toys including one or more of a squeaker, a bell, crinkle paper, and the like may be configured to make noise, entertaining pets. Other pet toys include balls, frisbees, wands, toys including treats (e.g., cat nip, dog treats), chew toys, and the like. However, in addition to keeping pets entertained, it is important to provide pets with a mental stimulus in order to improve their overall health and behavior. Accordingly, there is a need for more interactive pet toys that mentally stimulate pets.

SUMMARY OF THE DISCLOSURE

In accordance with one aspect of the present disclosure, a pet toy includes a first half and a second half rotatably coupled to the first half. In a first arrangement, the first half and the second half collectively form two or more independent pathways. Each of the two or more independent pathways may be configured to receive and convey an object. In a second arrangement, the first half and the second half collectively form a single pathway configured to receive and convey the object.

In accordance with another aspect of the present disclosure, a pet toy includes a pair of track modules coupled to one another. In a first arrangement, the pair of track modules collectively form two or more independent pathways. Each of the two or more independent pathways may be configured to receive and convey an object. In a second arrangement, the pair of track modules may collectively form a single pathway configured to receive and convey the object.

In accordance with yet another aspect of the present disclosure, a pet toy includes a pair of track modules coupled to one another and a base configured to support the pair of track modules in an upright position coupled to the pair of track modules. In a first arrangement, the pair of track modules collectively form two or more independent pathways. Each of the two or more independent pathways may be configured to receive and convey an object. In a second arrangement, the pair of track modules may collectively form a single pathway configured to receive and convey the object.

BRIEF DESCRIPTION OF THE DRAWING FIGURES

For a more complete understanding of the disclosure, reference should be made to the following detailed description and accompanying drawing figures, in which like reference numerals identify like elements in the figures.

Figure 1:
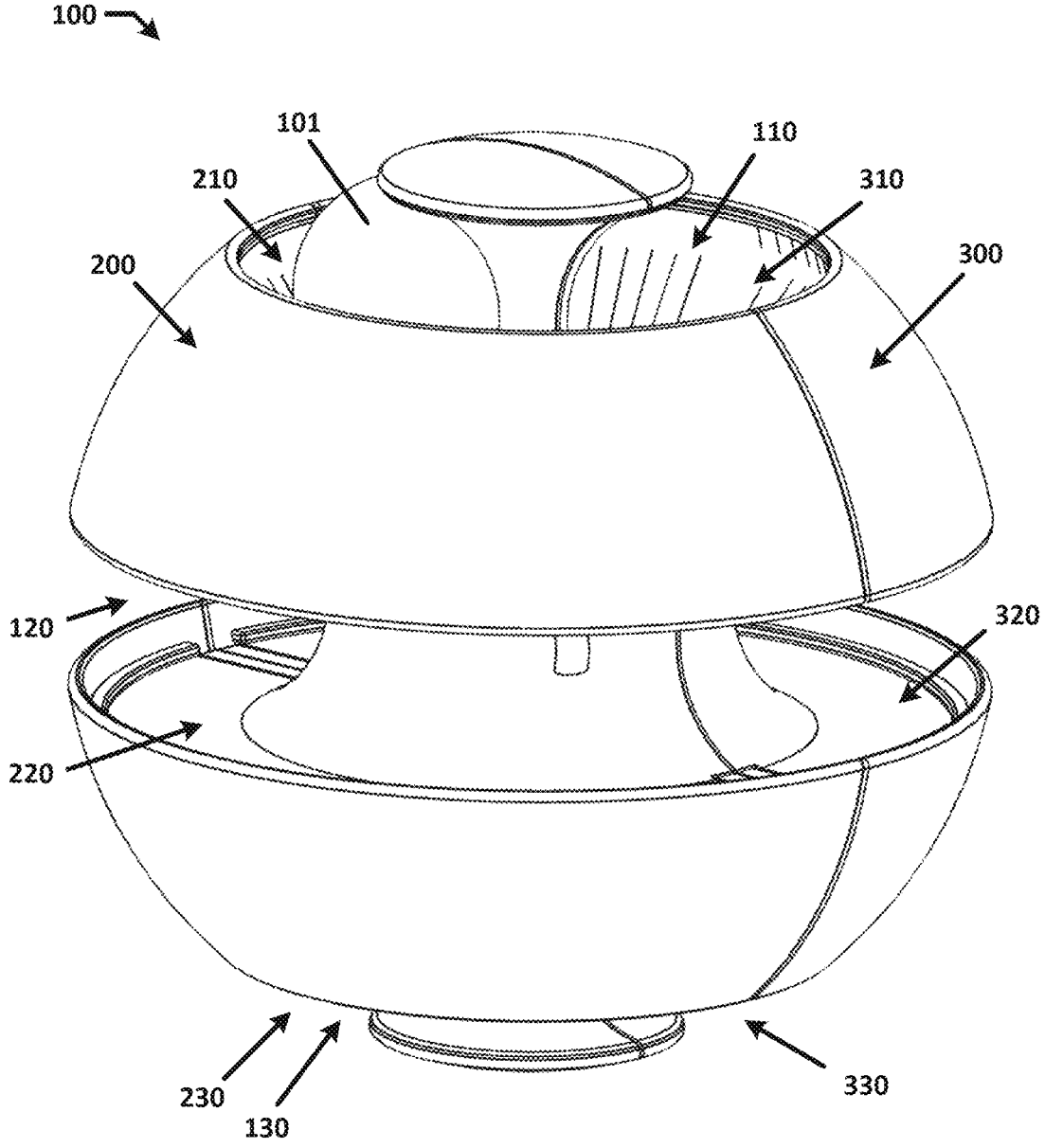
FIG. 1 illustrates a perspective view of a pet toy in accordance with one example of the present disclosure.

While the disclosed pet toys and methods are susceptible of embodiments in various forms, there are illustrated in the drawing (and will hereafter be described) specific embodiments of the disclosure, with the understanding that the disclosure is intended to be illustrative and is not intended to limit the disclosure to the specific embodiments described and illustrated herein.

DETAILED DESCRIPTION OF THE DISCLOSURE

The present disclosure is provided to solve the above-mentioned problems in the Background of the Disclosure section. Specifically, the present disclosure provides a pet toy include two halves (e.g., two track modules) configured to rotate relative to one another between multiple arrangements or configurations. Each of the first and second halves of the pet toy (e.g., the pair of track modules) include a plurality of tracks. The tracks included in the first and second halves (e.g., pair of track modules) may be arranged (e.g., relative to one another) to form pathways along which an object (e.g., ball) may be conveyed. The first and second halves (e.g., pair of track modules) may be rotated relative to one another between multiple arrangements in which different pathways along which an object may be conveyed are formed.

As described herein, the first and second halves (e.g., pair of track modules) of the pet toy may be rotated between multiple arrangements, such that the tracks included in the first and second halves form different pathways along which the ball may be conveyed in the different arrangements. A pet toy according to the present disclosure may advantageously mentally stimulate a pet by allowing the pet and/or a person (e.g., pet owner) to manipulate (e.g., rotate) the toy between multiple arrangements, changing a pathway or pathways through which the object may be conveyed.

Referring generally to the Figures, a pet toy 100 is illustrated in accordance with one example of the present disclosure. As shown, the pet toy 100 includes a first half 200 and a second half 300 (e.g., first and second halves 200, 300, a pair of track modules 200, 300). The first half 200 and the second half 300 may collectively form one or more pathways 110, 120, 130, 140, 145, 150, 155, 160, 165, 170 configured to convey an object 101 included in the pet toy 100. In some examples, the object 101 may be a sphere shaped ball. According to the present disclosure, the first half 200 and the second half 300 may be rotatably coupled to one another. Specifically, the first half 200 and the second half 300 may be configured to rotate relative to one another between two or more arrangements. The first half 200 and the second half 300 may collectively form different pathways along which the object 101 may be conveyed in the different arrangements of the first half 200 and the second half 300 relative to one another. According to some examples, the pet toy 100 may include two or more objects 101, for example, spherical balls, which may be conveyed along the pathways 110, 120, 130, 140, 145, 150, 155, 160, 165, 170 formed by the first half 200 and the second half 300.

The first half 200 and the second half 300 of the pet toy 100 may each include one or more tracks configured to convey the object 101. The tracks included in the first half 200 and the second half 300 may collectively comprise the pathways 110, 120, 130, 140, 145, 150, 155, 160, 165, 170 along which the object 101 may be conveyed. Accordingly, as an arrangement of the first half 200 and the second half 300 changes relative to one another (e.g., via rotation of the first half 200 and/or the second half 300), so may an arrangement of the tracks included in the first half 200 and the tracks included in the second half 300 relative to one another. Thus, the tracks in the first half 200 and the tracks in the second half 300 may align to form different pathways in the different arrangement of the first half 200 and the second half 300 relative to one another. Specifically, one or more tracks included in the first half 200 and one or more tracks included in the second half 300 may be aligned (e.g., via rotation of the first half 200 and/or second half 300 relative to one another) to form a pathway along which a ball may be conveyed.

Figure 2:
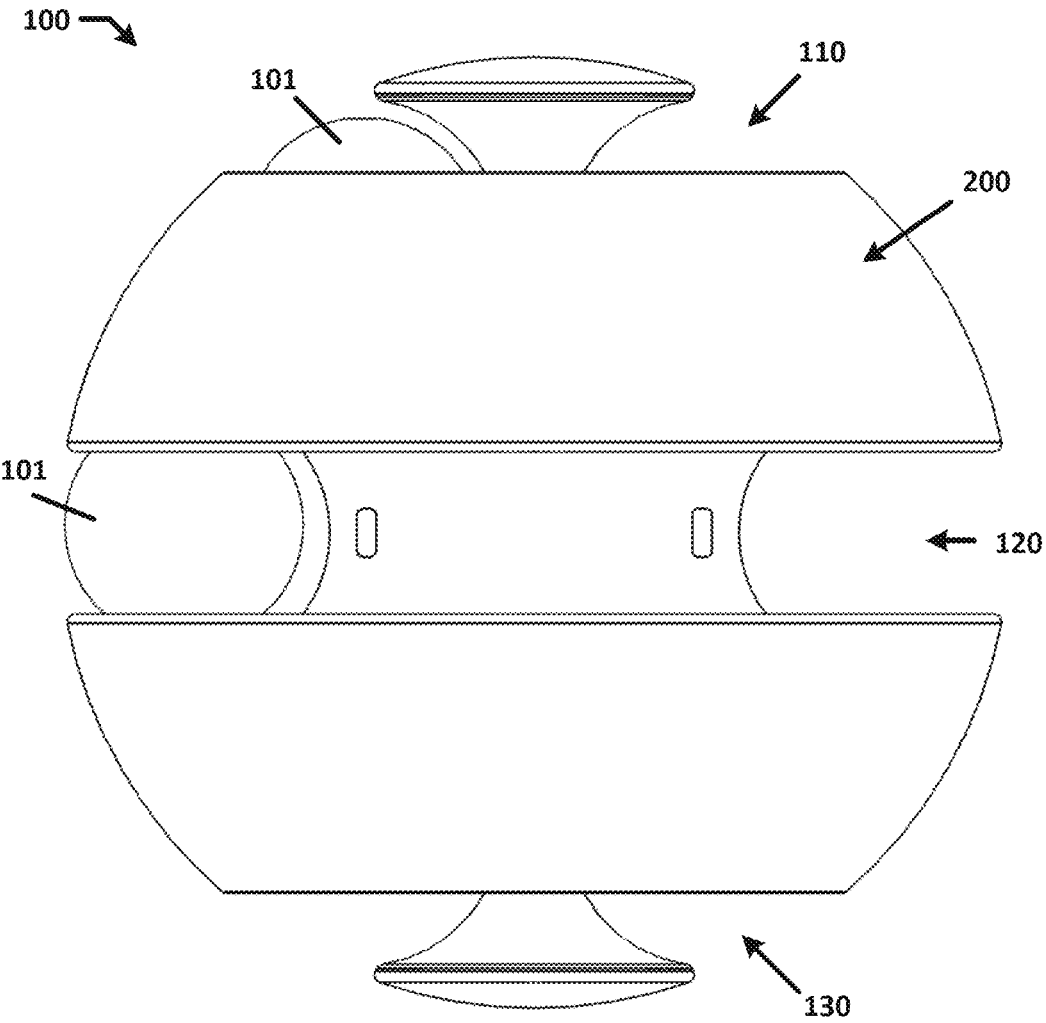
FIG. 2 illustrates a front view of the pet toy of FIG. 1 in accordance with one example of the present disclosure.
Figure 3:
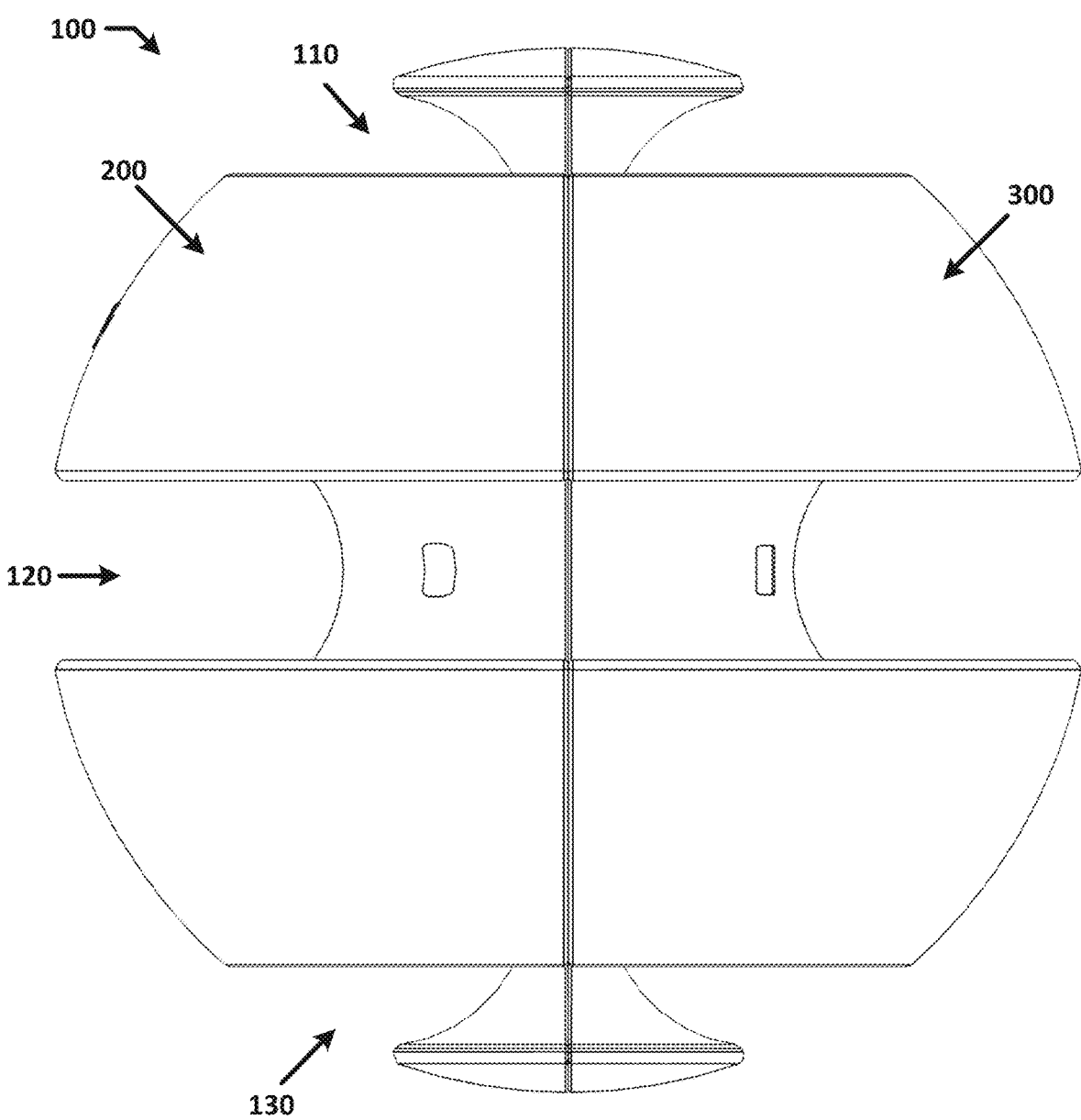
FIG. 3 illustrates a side view of the pet toy of FIG. 1 in accordance with one example of the present disclosure.
Figure 4:
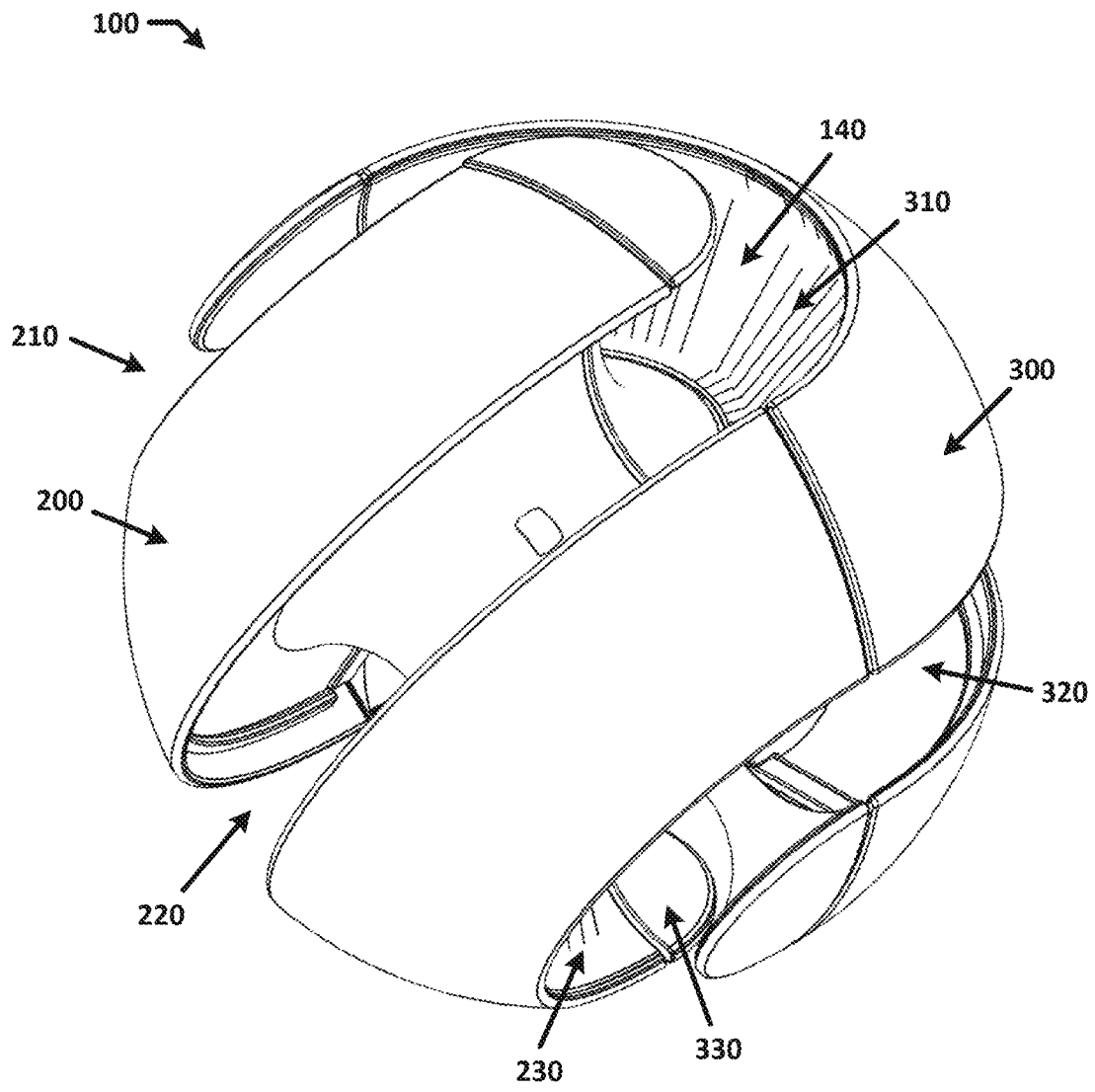
FIG. 4 illustrates a perspective view of the pet toy of FIG. 1 in a second arrangement in accordance with one example of the present disclosure.

The tracks included in the first half 200 and the tracks included in the second half 300 (e.g., the pair of track modules 200, 300) may form different pathways along which the object 101 may be conveyed in the different arrangements of the first half 200 and the second half 300 relative to one another. The number of pathways formed by the tracks included in the first half 200 and the second half, respectively, may vary based on the arrangement of the first half 200 and the second half 300 relative to one another. For example, in a first arrangement, as illustrated in FIGS. 1-3, the first half 200 and the second half 300 may collectively form two or more pathways along which the object 101 may be conveyed. Specifically, as illustrated in FIGS. 1-3, in a first arrangement the first half 200 and the second half 300 may collectively form three pathways. In the first arrangement, the first half 200 and the second half 300 may form a first pathway 110, a second pathway 120, and a third pathway 130. Further, in a second arrangement, as illustrated in FIG. 4, the first half 200 and the second half 300 may collectively form a single pathway 140 along which the object 101 may be conveyed.

In some examples of the present disclosure, all of the tracks included in first half 200 and all of the tracks included in the second half 300 may form a portion of a pathway along which an object 101 may be conveyed in each arrangement of the first half 200 and the second half 300 relative to one another.

Specifically, each track included in the first half 200 may align with a track included in the second half 300 and the aligned tracks may form (e.g., at least a portion of) a pathway along which an object 101 may be conveyed. Similarly, each track included in the second half 300 may align with a track included in the first half 200 and the aligned tracks may form (e.g., at least a portion of) a pathway along which an object 101 may be conveyed. According to some examples of the present disclosure, each pathway may include at least one track included in the first half 200 and at least one track included in the second half 300. Each pathway (e.g., 110, 120, 130, 140) formed in a respective arrangement of the first half 200 and the second half 300 relative to one another may be a closed loop, such that an object 101 included in the pathway may continuously be conveyed along or around the pathway.

Referring to FIGS. 1-3, a pet toy 100 is illustrated in a first arrangement in accordance with one example of the present disclosure. Specifically, FIG. 1 illustrates a perspective view of the pet toy 100 in a first arrangement in accordance with one example of the present disclosure. As shown in FIG. 1, the pet toy 100 may include a first half 200, a second half 300, and an object 101. In some examples, as illustrated in FIG. 1, the first half 200 and the second half 300 may each have a hemisphere shape. Accordingly, as shown in FIG. 1, in some examples, the first half 200 and the second half 300 may collectively form a pet toy 100 having a spherical shape. However, the present disclosure is not limited thereto and the first half 200, second half 300, and pet toy 100 may have any shape. For example, the first half 200 and the second half 300 may each have a rectangular shape, such that that the first half 200 and the second half 300 collectively form a pet toy 100 having a cube shape. In some examples, as illustrated in FIG. 1, the first half 200 and the second half 300 may have the same shape. In other examples, the first half 200 and the second half may have different shapes. The first half 200 and the second half may also have the same size.

The first half 200 and the second half 300 (e.g., pair of track modules 200, 300) may each include one or more tracks. The one or more tracks included in the first half 200 and the second half 300, respectively, may be configured to convey an object, for example, an object 101 there along and to form a portion of a pathway along which the object 101 may be conveyed. In some examples, as illustrated in FIG. 1, the first half 200 and the second half 300 may each include three tracks. Specifically, the first half 200 may include a first track 210, a second track 220, and a third track 230. Further, the second half 300 may include a fourth track 310, a fifth track 320, and a sixth track 330. However, the present disclosure is not limited thereto and the first half 200 and second half 300 may include any number of tracks. For example, the first half 200 and the second half 300 may each include one, two, three, four, five, or any other number of tracks. In accordance with some examples of the present disclosure, the first half 200 and the second half 300 may include the same number of tracks.

Referring to FIGS. 2 and 3, a front view and a side view, respectively, of the pet toy 100 are illustrated in accordance with one example of the present disclosure. In some examples, as illustrated in FIGS. 1-3, the first half 200 and the second half 300 may be the same or substantially similar to one another. Specifically, referring to FIG. 3, the first half 200 and the second half 300 may be symmetrical or substantially symmetrical about an interface between the first half 200 and the second half 300. As noted above, the first half 200 and the second half 300 may have the same size and/or shape as one another. Further, in some examples, as illustrated in FIG. 1, the first half 200 and the second half 300 may include tracks at the same arrangements. Specifically, as illustrated in FIGS. 1-3, an arrangement of the first track 210 included in the first half 200 may correspond to an arrangement of the fourth track 310 included in the second half 300. Further, an arrangement of the second track 220 included in the first half 200 may correspond to an arrangement of the fifth track 320 included in the second half 300. Additionally, an arrangement of the third track 230 included in the first half 200 may correspond to an arrangement of the sixth track 330 included in the second half 300. In this way, the arrangement of the first track 210 and fourth track 310 form the first pathway 110, the arrangement of the second track 220 and the fifth track 320 form the second pathway 120, and the arrangement of the third track 230 and the sixth track 330 form the third pathway 130, as described in greater detail below.

In some examples, as illustrated in FIG. 2, the pet toy 100 may include two or more objects 101, for examples, two or more balls. Each object 101 included in the pet toy 100 may be disposed within a track 210, 220, 230, 310, 320, 330 included in the first half 200 or second half 300. Additionally, when the first half 200 and the second half 300 are in one of multiple arrangements (e.g., first, second, third, fourth, fifth, sixth arrangements) in which the tracks in the first half 200 and the tracks in the second half 300 align to form one or more pathways, each object 101 may also be disposed in a pathway of the pet toy 100. When the first half 200 and the second half 300 are in one of the multiple arrangements (e.g., first, second, third, fourth, fifth, sixth arrangements), the object 101 may be free to move between the various tracks comprising the pathway in which the object 101 is disposed. Accordingly, the object 101 may move between the various pathways of the multiple arrangements by way of being disposed in a specific track included in the first half 200 or the second half 300 when the first half 200 and the second half 300 are rotated relative to one another between the multiple arrangements. Specifically, a ball disposed in any of the tracks (e.g., 210, 220, 230, 310,

320, 330) and thus disposed in one pathway including the track in which the object 101 is disposed may be disposed in another, different pathway including the track in which the object 101 is disposed when the first half 200 and the second half 300 are rotated relative to one another between one arrangement and another, different arrangement.

Figure 5:
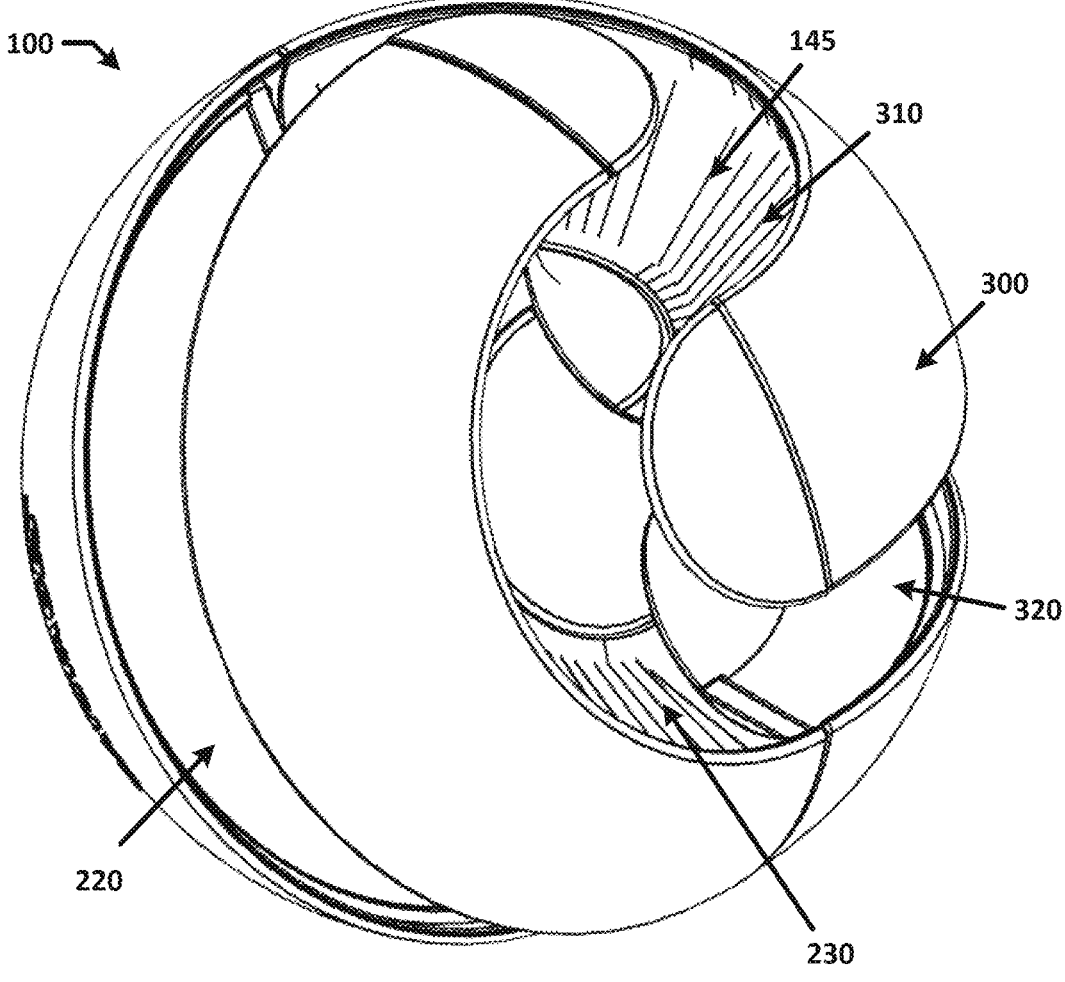
FIG. 5 illustrates a perspective view of the pet toy of FIG. 1 in a third arrangement in accordance with one example of the present disclosure.
Figure 6:
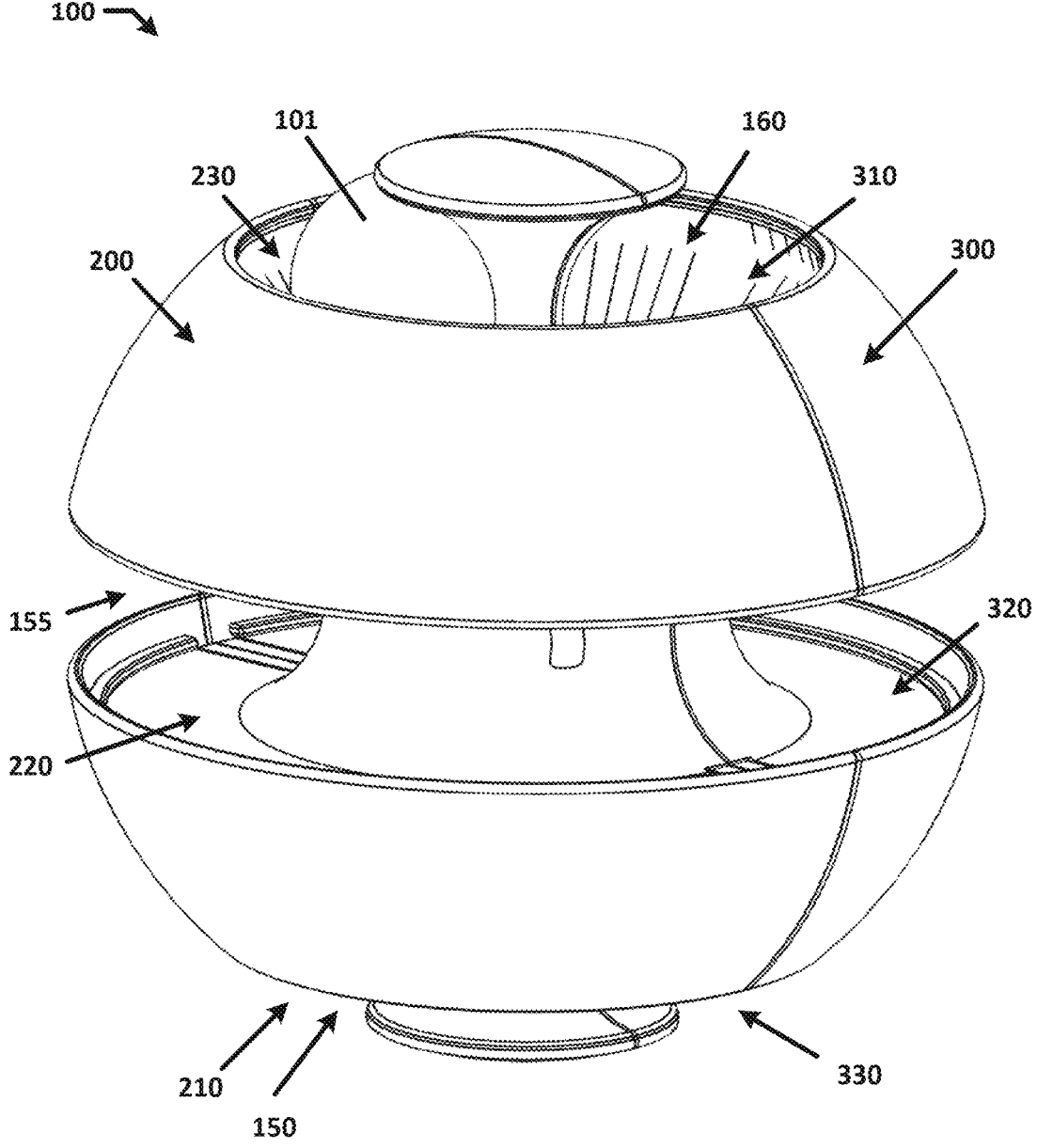
FIG. 6 illustrates a perspective view of the pet toy of FIG. 1 in a fourth arrangement in accordance with one example of the present disclosure.
Figure 7:
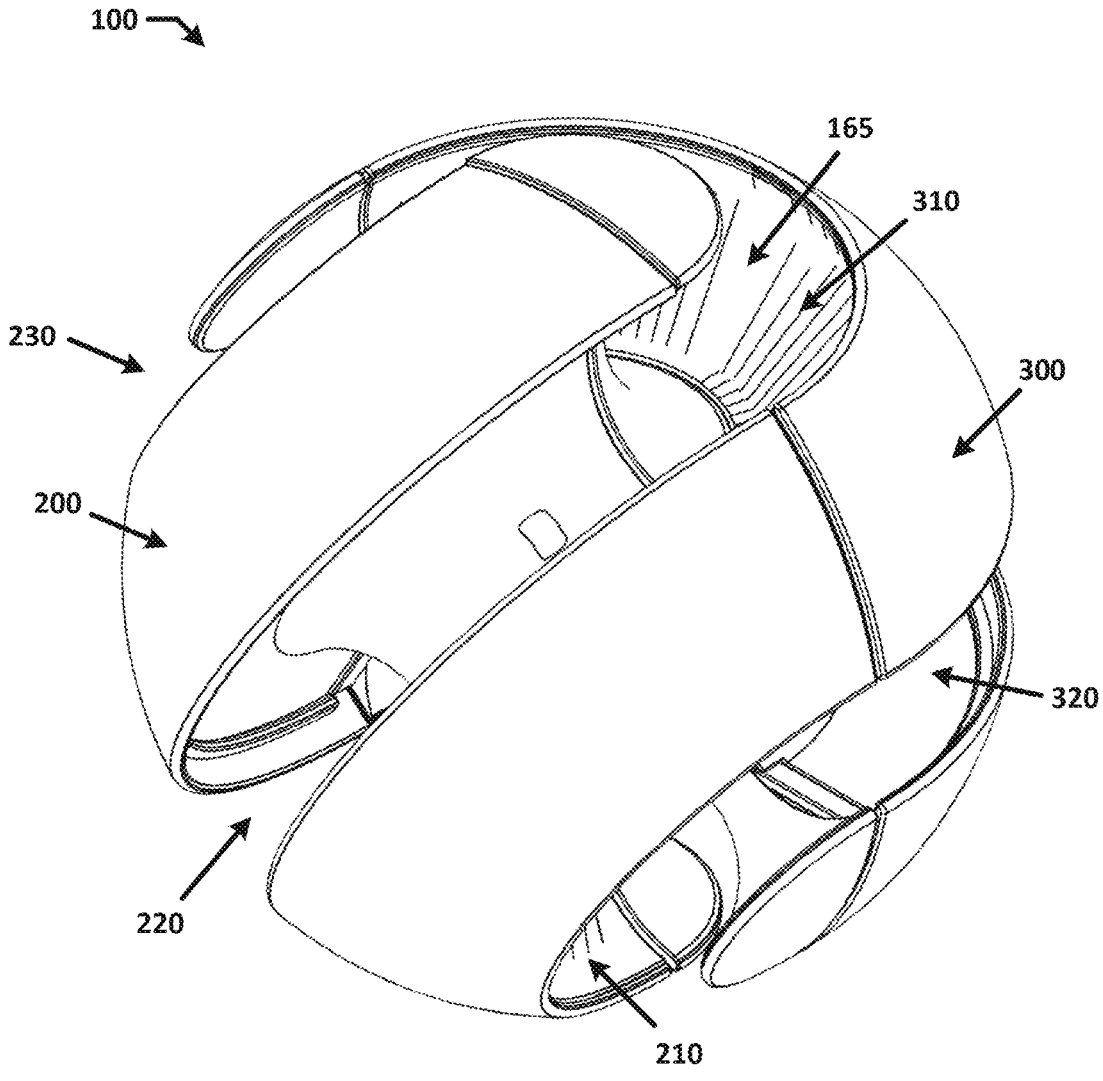
FIG. 7 illustrates a perspective view of the pet toy of FIG. 1 in a fifth arrangement in accordance with one example of the present disclosure.
Figure 8:
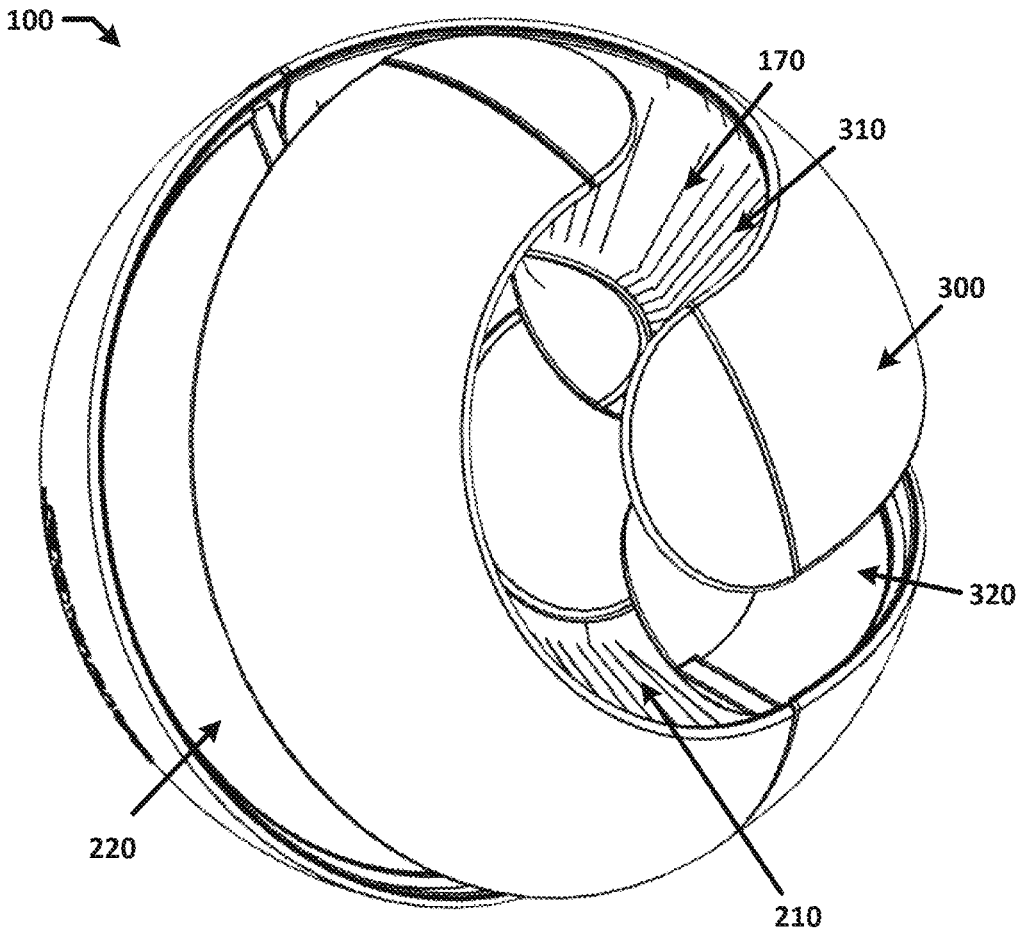
FIG. 8 illustrates a perspective view of the pet toy of FIG. 1 in a sixth arrangement in accordance with one example of the present disclosure.

Referring generally to FIGS. 1-8, the pet toy 100 may be configured to rotate between six different arrangements; a first arrangement illustrated in FIGS. 1-3; a second arrangement illustrated in FIG. 4; a third arrangement illustrated in FIG. 5; a fourth arrangement illustrated in FIG. 6; a fifth arrangement illustrated in FIG. 7; and a sixth arrangement illustrated in FIG. 8. Each of the arrangements may correspond to a different orientation or alignment of the first half 200 and the second half 300 relative to one another and may be achieved by rotating the first half 200 and/or the second half 300 relative to one another. According to some examples of the present disclosure, each of the arrangements may correspond to an orientation of the first half 200 and the second half 300 relative to one another in which both ends or sides of all of the tracks included in the first half 200 (e.g., 210, 220, 230) align or communicate with a track (e.g., 310, 320, 330) included in the second half 300 and in which both ends or sides of all of the tracks included in the second half 300 (e.g., 310, 320, 330) align or communicate with a track (e.g., 210, 220, 230) included in the first half 200. Specifically, each arrangement may correspond to an orientation of the first half 200 and the second half 300 relative to one another in which all of the tracks 210, 220, 230 included in the first half 200 and all of the tracks 310, 320, 330 included in the second half 300 are included in a pathway formed by the first half 200 and the second half 300, collectively.

Referring to FIGS. 1-3, the pet toy 100 may include three independent pathways when the first half 200 and the second half 300 are in a first arrangement relative to one another. Specifically, the tracks 210, 220, 230 included in the first half 200 and the tracks 310, 320, 330 included in the second half 300 may form three pathways when the first half 200 and the second half 300 are in the first arrangement relative to one another. Specifically, as illustrated in FIGS. 1-3, the pet toy 100 may include a first pathway 110, a second pathway 120, and a third pathway 130 when the first half 200 and the second half 300 are in a first arrangement relative to one another.

As illustrated in FIGS. 1-3, the first track 210 included in the first half 200 and the fourth track 310 included the second half 300 may collectively form the first pathway 110. Specifically, as shown in FIGS. 1-3, both ends of the first track 210 and both ends of the fourth track 140 may communicate with one another, forming the first pathway 110. According to some examples of the present disclosure, the first pathway 110 may be an independent pathway including only the first track 210 and the fourth track 310. In some examples, the first pathway 110 may have a circular or substantially circular shape.

Further, as illustrated in FIGS. 1-3, the second track 220 included in the first half 200 and the and fifth track 320 included in the second half 300 may collectively form the second pathway 120. Specifically, as shown in FIGS. 1-3, both ends of the second track 220 and both ends of the fifth track 320 may communicate with one another, forming the second pathway 120. According to some examples of the present disclosure, the second pathway 120 may be an independent pathway including only the second track 220 and the fifth track 320. In some examples, the second pathway 120 may have a circular or substantially circular shape.

Additionally, as illustrated in FIGS. 1-3, the third track 230 included in the first half 200 and the sixth track 330 included in the second half 300 may collectively form the third pathway 130. Specifically, as shown in FIGS. 1-3, both ends of the third track 230 and both ends of the sixth track 330 may communicate with one another, forming the third pathway 130. According to some examples of the present disclosure, the third pathway 130 may be an independent pathway including only the third track 230 and the sixth track 330. In some examples, the third pathway 130 may have a circular or substantially circular shape.

Referring generally to FIGS. 1-8, the pet toy may be transformed or moved sequentially between each of the first arrangement illustrated in FIGS. 1-3, second arrangement illustrated in FIG. 4, third arrangement illustrated in FIG. 5, fourth arrangement illustrated in FIG. 6, fifth arrangement illustrated in FIG. 7, and sixth arrangement illustrated in FIG. 8 by rotating the first half 200 and/or the second half 300 in the same direction(s) relative to one another.

According to one method, the pet toy 100 may be sequentially transformed through the first arrangement, second arrangement, third arrangement, fourth arrangement, fifth arrangement, and sixth arrangement by iteratively moving only one of the first half 200 and the second half 300 in a first or same direction relative to the other of the first half 200 and the second half 300. Specifically, one of the first half 200 and the second half 300 may be iteratively rotated in the same direction relative to the other of the first half 200 and the second half 300, sequentially, between the first arrangement and the second arrangement, between the second arrangement and the third arrangement, between the third arrangement and the fourth arrangement, between the fourth arrangement and the fifth arrangement, between the fifth arrangement and the sixth arrangement, and between the sixth arrangement and the first arrangement. In some examples, one of the first half 200 or the second half 300 may be rotated 60° relative the other of the first half 200 or the second half 300 between adjacent or sequential arrangement of the pet toy 100. In some examples, the first half 200 and/or the second half 300 may each be rotated in the same direction and the same magnitude (e.g., 30 degrees) relative to one another between each of the first arrangement and second arrangement, second arrangement and third arrangement, third arrangement and fourth arrangement, fourth arrangement and fifth arrangement, fifth arrangement and sixth arrangement, and sixth arrangement and first arrangement.

According to another method, the pet toy 100 may be sequentially transformed through the first arrangement, the second arrangement, the third arrangement, the fourth arrangement, the fifth arrangement, and the sixth arrangement by iteratively rotating the first half 200 and the second half 300 in opposite directions relative to one another. Specifically, the first half 200 and the second half 300, individually, may iteratively be rotated in the same direction in order to sequentially transform or move the pet toy 100 between the first arrangement and the second arrangement, between the second arrangement and the third arrangement, between the third arrangement and the fourth arrangement, between the fourth arrangement and the fifth arrangement, between the fifth arrangement and the sixth arrangement, and between the sixth arrangement and the first arrangement.

Referring generally to FIGS. 1-8, for ease of explanation, the second half 300 of the pet toy 100 is illustrated in the same orientation and the pet toy 100 is described as moving or transforming between the first arrangement, the second arrangement, the third arrangement, the fourth arrangement, the fifth arrangement, and the sixth arrangement via rotation of the only the first half 200 relative to the second half 300. However, as noted above, the present disclosure is not limited thereto; and in some examples, both of the first half 200 and the second half 300 may be rotated in opposite directions relative to one another between the various arrangements of the pet toy 100.

Referring to FIG. 4, a perspective view of the pet toy 100 in a second arrangement is illustrated in accordance with one example of the present disclosure. As described above, the pet toy 100 may be moved from the first arrangement illustrated in FIGS. 1-3 to the second arrangement illustrated in FIG. 4 by rotating the first half 200 and/or the second half 300 relative to one another. Specifically, in some examples, as illustrated in FIG. 4, the pet toy 100 may be moved from the first arrangement to the second arrangement by rotating the first half 200 in a first direction relative to the second half 300.

As illustrated in FIG. 4, the pet toy 100 may include a single pathway when the first half 200 and the second half 300 are in a second arrangement relative to one another. Specifically, the first track 210, second track 220, third track 230, fourth track 310, fifth track 320, and sixth track 330 may collectively form a fourth pathway 140. According to some examples, as shown in FIG. 4, when the pet toy 100 is in the second arrangement: the first track 210 may be aligned with and directly communicate with the fourth track 310 and the fifth track 320; the second track 220 may be aligned with and directly communicate with the fourth track 310 and the sixth track 330; the third track 230 may be aligned with and directly communicate with the fifth track 320 and the sixth track 330; the fourth track 310 may be aligned with and directly communicate with the first track 210 and the second track 220; the fifth track 320 may be aligned with and directly communicate with first track 210 and the third track 230; and the sixth track 330 may be aligned with and directly communicate with the second track 220 and the third track 230.

Referring to FIG. 5, a perspective view of the pet toy 100 in a third arrangement is illustrated in accordance with one example of the present disclosure. As described above, the pet toy 100 may be moved from the second arrangement illustrated in FIG. 4 to the third arrangement illustrated in FIG. 5 by rotating the first half 200 and/or the second half 300 relative to one another. Specifically, in some examples, as illustrated in FIG. 5, the pet toy 100 may be moved from the second arrangement to the third arrangement by rotating the first half 200 in the first direction relative to the second half 300.

As illustrated in FIG. 5, the pet toy 100 may include a single pathway when the first half 200 and the second half 300 are in the third arrangement relative to one another. Specifically, the first track 210, second track 220, third track 230, fourth track 310, fifth track 320, and sixth track 330 may collectively form a fifth pathway 145. According to some examples, the fifth pathway 145 may have the same shape as or be similar to the fourth pathway 140. Specifically, in some examples, the fifth pathway 145 may have the same shape as the fourth pathway 140 but may be rotated relative to the fourth pathway. According to some examples, as illustrated in FIG. 5, when the pet toy 100 is in the third arrangement: the first track 210 may be aligned with and directly communicate with the fifth track 320 and the sixth track 330; the second track 220 may be aligned with and directly communicate with the fourth track 310 and the sixth track 330; the third track 230 may be aligned with and directly communicate with the fourth track 310 and the fifth track 320; the fourth track 310 may be aligned with and directly communicate with the second track 220 and the third track 230; the fifth track 320 may be aligned with and directly communicate with the first track 210 and the third track 230; and the sixth track 330 may be aligned with and directly communicate with the second track the first track 210.

Referring to FIG. 6, a perspective view of the pet toy 100 in a fourth arrangement is illustrated in accordance with one example of the present disclosure. As described above, the pet toy 100 may be moved from the third arrangement illustrated in FIG. 5 to the fourth arrangement illustrated in FIG. 6 by rotating the first half 200 and/or the second half 300 relative to one another. Specifically, in some examples, as illustrated in FIG. 6, the pet toy 100 may be moved from the third arrangement to the fourth arrangement by rotating the first half 200 in the first direction relative to the second half 300.

Still referring to FIG. 6, the pet toy 100 may include three independent pathways when the first half 200 and the second half are in a fourth arrangement relative to one another. Specifically, the first track 210, second track 220, and third track 230 included in the first half 200 and fourth track 310, fifth track 320, and sixth track 330 included in the second half 300 may form three pathways when the first half 200 and the second half 300 are in the fourth arrangement relative to one another. Specifically, as illustrated in FIG. 6, the pet toy 100 may include a sixth pathway 150, a seventh pathway 155, and an eighth pathway 160 when the pet toy 100 is in the fourth arrangement.

As shown in FIG. 6, the first track 210 included in the first half 200 and the sixth track 330 included in the second half 300 may collectively form the sixth pathway 150. Specifically, as shown in FIG. 6, both ends of the first track 210 and both ends of the sixth track 330 may communicate with one another, forming the sixth pathway 150. According to some examples of the present disclosure, the sixth pathway 150 may be an independent pathway including only the first track 210 and the sixth track 330. The sixth pathway 150 may have a circular or substantially circular shape.

Additionally, as illustrated in FIG. 6, the second track 220 and the fifth track 320 may collectively form the seventh pathway 155. Specifically, as shown in FIG. 6, both ends of the second track 220 and both ends of the fifth track 320 may communicate with one another, forming the seventh pathway 155. According to some examples of the present disclosure, the seventh pathway 155 may be an independent pathway including only the second track 220 and the fifth track 320. In some examples, the seventh pathway 155 may have a circular or substantially circular shape.

Additionally, as shown in FIG. 6, the third track 230 included in the first half 200 and the fourth track 310 included in the second half 300 may collectively form the eighth pathway 160. Specifically, as shown in FIG. 6, both ends of the third track 230 and both ends of the fourth track 310 may communicate with one another, forming the eighth pathway 160. According to some examples of the present disclosure, the eighth pathway 160 may be an independent pathway including only the third track 230 and the fourth track 310. In some examples, the eighth pathway 160 may have a circular or substantially circular shape.

Referring to FIG. 7, a perspective view of the pet toy 100 in a fifth arrangement is illustrated in accordance with one example of the present disclosure. As described above, the pet toy 100 may be moved from the fourth arrangement illustrated in FIG. 6 to the fifth arrangement illustrated in FIG. 7 by rotating the first half 200 and/or the second half 300 relative to one another. Specifically, as illustrated in FIG. 7, the pet toy 100 may be moved from the fourth arrangement to the fifth arrangement by rotating the first half 200 in the first direction relative to the second half 300.

As illustrated in FIG. 7, the pet toy 100 may include a single pathway when the first half 200 and the second half 300 are in the fifth arrangement relative to one another. Specifically, the first track 210, second track 220, and third track 230 included in the first half 200 and fourth track 310, fifth track 320, and sixth track 330 may collectively form a ninth pathway 165. According to some examples, the ninth pathway 165 may have the same shape or be similar to the fourth pathway 140 and the fifth pathway 145. Specifically, in some examples, the ninth pathway 165 may have the same shape as the fourth pathway 140 and/or the fifth pathway 145 but may be rotated relative to the fourth pathway 140 and/or fifth pathway 145. According to some examples, as illustrated in FIG. 7, when the pet toy 100 is in the fifth arrangement: the first track 210 may be aligned with and directly communicate with the fifth track 320 and the sixth track 330; the second track 220 may be aligned with and directly communicate with the fourth track 310 and the sixth track 330; the third track 230 may be aligned with and directly communicate with the fourth track 310 and the fifth track 320; the fourth track 310 may be aligned with and directly communicate with the third track 230 and the second track 220; the fifth track 320 may be aligned with and directly communicate with the first track 210 and the third track 230; and the sixth track 330 may be aligned with and directly communicate with the first track 210 and the second track 220.

Referring to FIG. 8, a perspective view of the pet toy 100 in a sixth arrangement is illustrated in accordance with one example of the present disclosure. As described above, the pet toy 100 may be moved from the fifth arrangement illustrated in FIG. 7 to the sixth arrangement illustrated in FIG. 8 by rotating the first half 200 and/or the second half 300 relative to one another. Specifically, in some examples, as illustrated in FIG. 8, the pet toy 100 may be moved from the fifth arrangement to the sixth arrangement by rotating the first half 200 in the first direction relative to the second half 300.

As illustrated in FIG. 8, the pet toy 100 may include a single pathway when the first half 200 and the second half 300 are in the sixth arrangement relative to one another. Specifically, the first track 210, second track 220, and third track 230 included in the first half 200 and fourth track 310, fifth track 320, and sixth track 330 included in the second half 300 may collectively form a tenth pathway 170. According to some examples, the tenth pathway 170 may have the same shape or be similar to the fourth pathway 140, the fifth pathway 145, and/or the ninth pathway 165. Specifically, in some examples, the tenth pathway 170 may have the same shape as the fourth pathway 140, the fifth pathway 145, and/or the ninth pathway 165 but may be rotated relative to the fourth pathway 140, fifth pathway 145, and/or ninth pathway 165. According to some examples, as illustrated in FIG. 8, when the pet toy 100 is in the sixth arrangement: the first track 210 may be aligned with and directly communicate with the fourth track 310 and the fifth track 320; the second track 220 may be aligned with and directly communicate with the fourth track 310 and the sixth track 330; the third track 230 may be aligned with and directly communicate with the fifth track 320 and the sixth track 330; the fourth track 310 may be aligned with and directly communicate with the first track 210 and the second track 220; the fifth track 320 may be aligned with and directly communicate with the first track 210 and the third track 230; and the sixth track 330 may be aligned with and directly communicate with the second track 220 and the third track 230.

As described above, the pet toy 100 may be rotated from the sixth arrangement illustrated in FIG. 8 to the first arrangement illustrated in FIGS. 1-3 by rotating the first half 200 and/or the second half 300 relative to one another. Specifically, in some examples, the pet toy 100 may be moved from the sixth arrangement to the first arrangement by rotating the first half 200 in the first direction relative to the second half 300.

Figure 9:
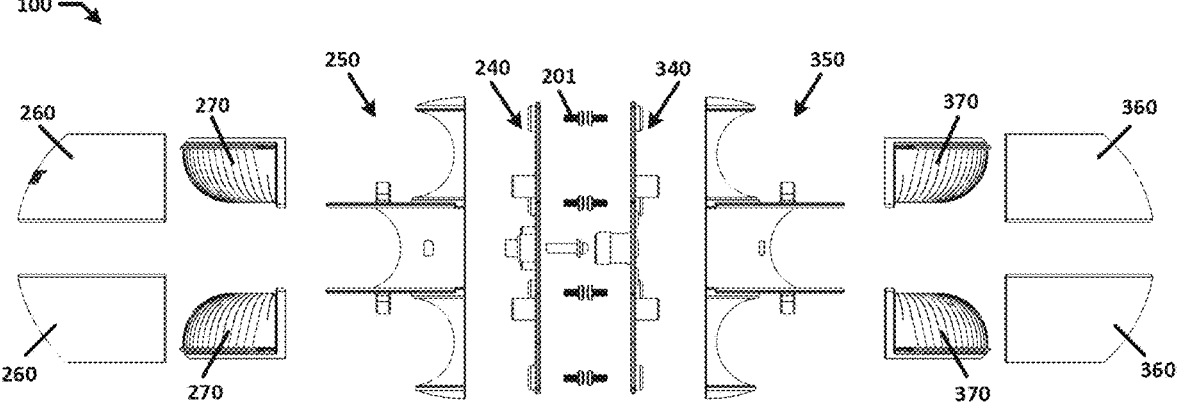
FIG. 9 illustrates an exploded side view of the pet toy of FIG. 1 in accordance with one example of the present disclosure.

Referring to FIG. 9, an exploded view of the pet toy 100 described above is illustrated in accordance with one example of the present disclosure. As noted above, in some examples of the present disclosure, the first half 200 and the second half 300 may be the same or substantially similar. Specifically, in some examples, the first half 200 and the second half 300 may include the same or substantially similar components. Further, in some examples, the respective arrangements and relationships of the constituent components included in the first half 200 and the constituent components included in the second half 300, including but not limited to arrangements relative to and connections with other components in the respective half, may be the same. The first half 200 and the second half 300 may each include a part of an inner hub 440 (e.g., first half inner hub 240, second half inner hub 340), an inner core 450 (e.g., first half inner core 250, second half inner core 350), a pair of outer shells 460 (e.g., first half outer shells 260, second half outer shells 360), and a pair of track parts 470 (e.g., first half track part 270, second half track part 370).

As shown in FIG. 9, the first half 200 may include a first half inner hub 240, a first half inner core 250, a pair of first half outer shells 260, and a pair of first half track parts 270. Similarly, the second half 300 may include a second half inner hub 340, a second half inner core 350, a pair of second half outer shells 360, and a pair of second half track parts 370. In some examples of the present disclosure, the first half inner core 250, the pair of first half outer shells 260, and the pair of first half track parts 270 may be the same or substantially similar to the second half inner core 350, the pair of second half outer shells 360, and the pair of second half track parts 370, respectively. Accordingly, the first half inner hub 240 and the second half inner hub may be described herein as the inner hub 440. Further, the first half inner core 250 and the second half inner core 350 are described hereinafter as the inner core 450. Similarly, the pair of first half outer shells 260 and the pair of second half outer shells 360 are described as the pair of outer shells 460. Additionally, the pair of first half track parts 270 and the pair of second half track parts 370 are described as the pair of track parts 470. The first half inner core 250, pair of first half outer shells 260, and pair of first half track parts 270 may be coupled to the first half inner hub 240. Similarly, the second half inner core 350, the pair of second half outer shells 360, and the pair of second half track parts 370 may be coupled to the second half inner hub 340.

Accordingly, as noted above, the respective positions and relationships of the inner hub (e.g., first half inner hub 240, second half inner hub 340), the inner core 450, the pair of outer shells 460, and the pair of track parts 470 in the first half 200 and the second half 300 may be the same. According to some examples of the present disclosure, the first half inner hub 240 and the second half inner hub 340 may be coupled to one another, coupling the first half 200 and the second half 300 to one another. A connection between the first half inner hub 240 and the second half inner hub 340 is described hereinafter in greater detail.

Figure 10:
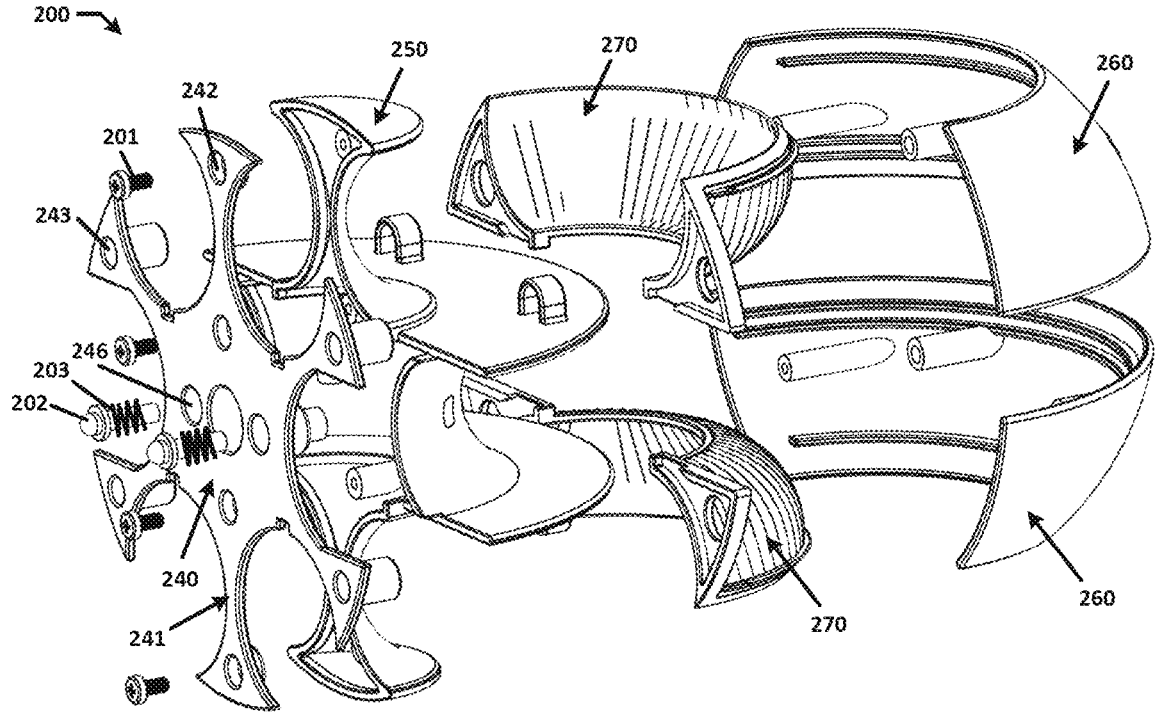
FIG. 10 illustrates an exploded perspective view of a first half of the pet toy of FIG. 1 in accordance with one example of the present disclosure.

Referring to FIG. 10, an exploded perspective view of the first half 200 of the pet toy 100 described above is illustrated in accordance with one example of the present disclosure. As shown in FIG. 10 and noted above with respect to FIG. 9, the first half 200 includes a first half inner hub 240, a first half inner core 250, a pair of first half outer shells 260, and a pair of first half track parts 270. The first half inner hub 240, first half inner core 250, pair of first half outer shells 260, and pair of first half track parts 270 may all be coupled to one another and collectively form the first half 200. Referring generally to FIG. 10, the first half inner hub 240 may be directly coupled to the first half inner core 250, the pair of first half outer shells 260, and the pair of first half track parts 270. Additionally, as shown in FIG. 10, each of the pair of first half track parts 270 may be disposed between the first half inner hub 240 and one of the pair of first half outer shells 260.

Figure 11:
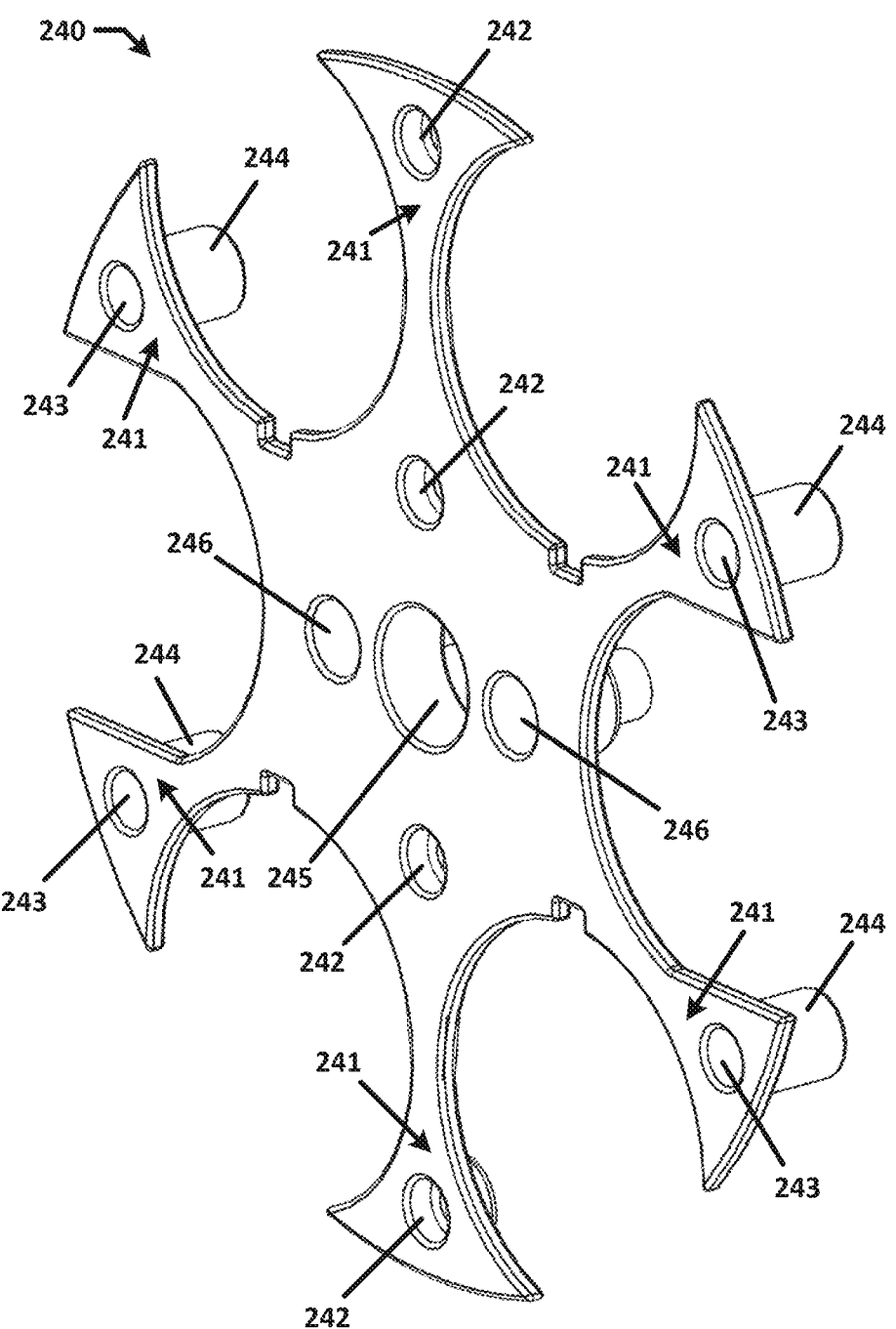
FIG. 11 illustrates a perspective view of a first half of an inner hub of the pet toy of FIG. 1 in accordance with one example of the present disclosure.

Referring to FIG. 11, a perspective view of the first half inner hub 240 is illustrated in accordance with one example of the present disclosure. According to some examples, the first half inner hub 240 may include a plurality of spokes 241. Each of the spokes 241 may extend or protrude radially outward from a center of the first half inner hub 240. In some examples, as illustrated in FIG. 11, the first half inner hub 240 may include six spokes 241. According to some examples, a track (e.g., 210, 220, 230) may be disposed in a space between adjacent spokes 241 included in the first half inner hub 240.

The first half inner hub 240 may further include a plurality of core mounting holes 242. Each of the core mounting holes 242 may extend through the first half inner hub 240 and be configured to receive a fastener 201 for coupling the first half inner hub 240 to the first half inner core 250. In some examples, as illustrated in FIG. 11, the first half inner hub 240 may include four core mounting holes 242. In some examples, the core mounting holes 242 may be disposed linearly. For example, as shown in FIG. 11, a core mounting hole 242 may be disposed on each of a pair of opposite spokes 241 included in the first half inner hub 240 and two core mounting holes 242 may be disposed between the core mounting holes 242 disposed on the pair of opposite spokes 241.

The first half inner hub 240 may further include a plurality of shell mounting holes 243 and a plurality of shell receptacles 244. Each of the shell mounting holes 243 may extend through the first half inner hub 240 and be configured to receive a portion of one of the pair of first half outer shells 260. The shell mounting holes 243 and the shell receptacles 244 may be provided in corresponding number and at corresponding locations. Specifically, each of the shell receptacles 244 may extend or protrude from the first half inner hub 240 and include a channel coincident with a corresponding shell mounting hole 243 and configured to receive a portion of one of the pair of first half outer shells 260. In some examples, as illustrated in FIG. 11, the first half inner hub 240 may include four shell mounting holes 243 and four shell receptacles 244. In some examples, each of the shell mounting holes 243 and the shell receptacles 244 may be disposed on a spoke 241 of the first half inner hub 240.

The first half inner hub 240 may further include a first half coupling hole 245. In some examples, as illustrated in FIG. 11, the first half coupling hole 245 may be disposed in a center of the first half inner hub 240. As described hereinafter in greater detail, the first half coupling hole 245 may be configured to receive a portion of the second half 300, coupling the first half 200 and the second half 300 to one another. Specifically, in some examples, the first half coupling hole 245 may be configured to receive a portion of the second half inner hub 340.

The first half inner hub 240 may further include one or more pin sockets 246. In some examples, as illustrated in FIG. 11, the first half inner hub 240 may include two pin sockets 246. Referring to FIGS. 10 and 11, each of the pin sockets 246 may be configured to receive a pin 202 and a biasing member 203. As described in greater detail hereinafter, the pin 202 and biasing member 203 may be configured to maintain an arrangement of the first half 200 and the second half 300 relative to one another.

Figure 12:
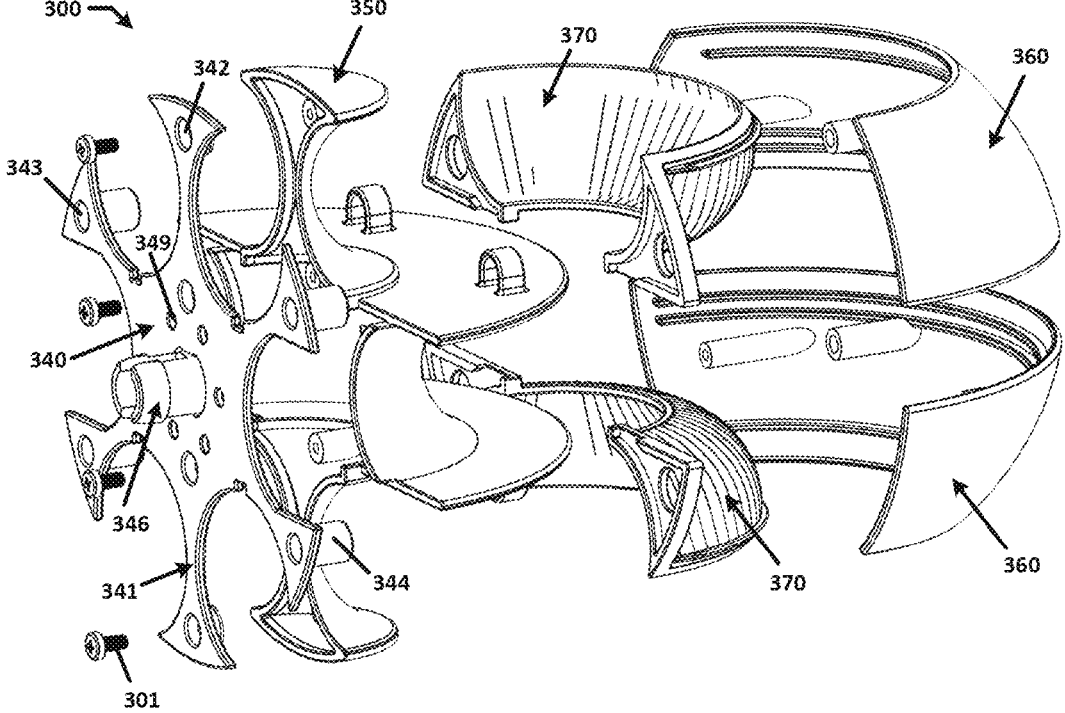
FIG. 12 illustrates an exploded perspective view of a second half of the pet toy of FIG. 1 in accordance with one example of the present disclosure.

Referring to FIG. 12, an exploded perspective view of the second half 300 of the pet toy 100 described above is illustrated in accordance with one example of the present disclosure. As shown in FIG. 12 and noted above with respect to FIG. 9, the second half 300 includes a second half inner hub 340, a second half inner core 350, a pair of second half outer shells 360, and a pair of second half track parts 370. The second half inner hub 340, second half inner core 350, pair of second half outer shells 360, and pair of second half track parts 370 may be coupled to one another and collectively form the second half 300. Referring generally to FIG. 12, the second half inner hub 340 may be directly coupled to the second half inner core 350, the pair of second half outer shells 360, and the pair of second half track parts 370. Additionally, as shown in FIG. 12, each of the pair of second half track parts 370 may be disposed between the second half inner hub 340 and one of the pair of second half outer shells 360.

Figure 13:
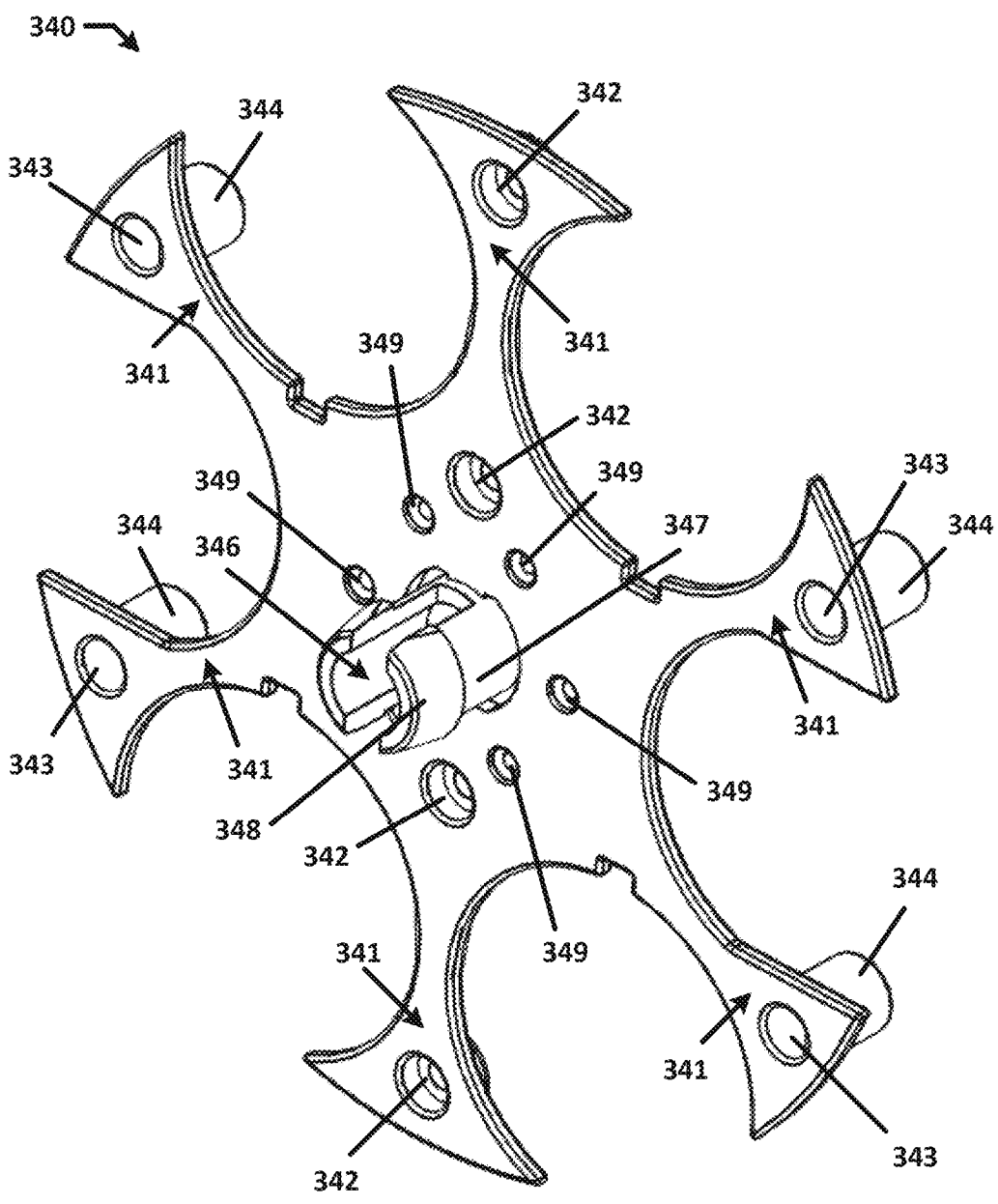
FIG. 13 illustrates a second half of the inner hub of the pet toy of FIG. 1 in accordance with one example of the present disclosure.

Referring to FIG. 13, a perspective view of the second half inner hub 340 is illustrated in accordance with one example of the present disclosure. According to some examples, the second half inner hub 340 may include a plurality of spokes 341. The plurality of spokes 341 may be the same as the spokes 241 included in the first half inner hub 240. In some examples, as illustrated in FIG. 13, the second half inner hub 340 may include six spokes 341. According to some examples, a track (e.g., 310, 320, 330) may be disposed in a space between adjacent spokes 341 includes in the second half inner hub 340.

The second half inner hub 340 may further include a plurality of core mounting holes 342. Each of the core mounting holes 342 may extend through the second half inner hub 340 and be configured to receive a fastener 301 for coupling the second half inner hub 340 to the second half inner core 350. In some examples, as illustrated in FIG. 13, the second half inner hub 340 may include four core mounting holes 342. In some examples, the core mounting holes 342 may be disposed linearly. For example, as shown in FIG. 13, a core mounting hole 342 may be disposed on each of a pair of opposite spokes 341 included in the second half inner hub 340 and two core mounting holes 342 may be disposed between the core mounting holes 342 disposed on the pair of opposite spokes 341.

The second half inner hub 340 may further include a plurality of shell mounting holes 343 and a plurality of shell receptacles 344. Each of the shell mounting holes 343 may extend through the second half inner hub 340 and be configured to receive a portion of one of the pair of second half outer shells 360. The shell mounting holes 343 and the shell receptacles 344 may be provided in corresponding number and at corresponding locations. Specifically, each of the shell receptacles 344 may extend or protrude from the second half inner hub 340 and include a channel coincident with a corresponding shell mounting hole 343 and configured to receive a portion of one of the pair of second half outer shells 360. In some examples, as illustrated in FIG. 13, the second half inner hub 340 may include four shell mounting holes 343 and four shell receptacles 344. In some examples, each of the shell mounting holes 343 and the shell receptacles 344 may be disposed on a spoke 341 of the second half inner hub 340.

Still referring to FIG. 13, the second half inner hub 340 may further include a second half coupling projection 346. The second half coupling projection 346 may be configured to be inserted through the first half coupling hole 245 included in the first half inner hub 240, coupling the first half inner hub 240 and the second half inner hub 340. The second half coupling projection 346 may be disposed at a center of the second half inner hub 340 and include a pair of protrusions 347 extending from a body of the second half inner hub 340. The protrusions 347 may extend from the body of the second half inner hub 340 in an opposite direction than the shell receptacles 344. Each of the protrusions 347 may have a curved shape, such that the pair of protrusions 347 collectively form a cylindrical second half coupling projection 346. Each of the protrusions 347 may further include a barb 348 disposed at a distal end of the protrusion 347 (i.e., distally in reference to the body of the second half inner hub 340). The pair of protrusions 347 may be configured to elastically deform as the second half coupling projection 346 is inserted through the first half coupling hole 245. Specifically, the pair of protrusions 347 may be configured to deform as the barbs 348 are inserted through the first half coupling hole 245. After the barbs 348 have been inserted through the first half mounting hole 245, the barbs 348 may be configured to engage the first half inner hub 240, preventing the second half coupling projection 346 (and thus the second half inner hub 340) from being withdrawn from the first half inner hub 240, coupling the first half inner hub 240 and the second half inner hub 340.

As shown in FIG. 13, the second half inner hub 340 may further include a plurality of detents 349. Each of the detents 349 may be configured to receive a portion of a pin 202 included in the first half inner hub 240. Specifically, in some examples, the pair of detents 349 may be disposed radially around a center of the second half inner hub 340 and correspond to the various arrangements of the first half 200 and the second half 300. Specifically, the detents 349 may be positioned in the second half inner hub 340 such that each of the pins 202 included in the first half inner hub 240 is disposed in a detent 349 included in the second half inner hub 340 in each of the multiple arrangements of the first half 200 and the second half 300 relative to one another. Thus, as the first half 200 and second half 300 rotate relative to one another between arrangements, the pins 202 are forced out of the detents 349, slide along the body of the second half inner hub 340, and then engage with another detent 349 in the direction of rotation to position the components a subsequent arrangement. This is described in greater detail below with reference to FIG. 17.

Figure 14:
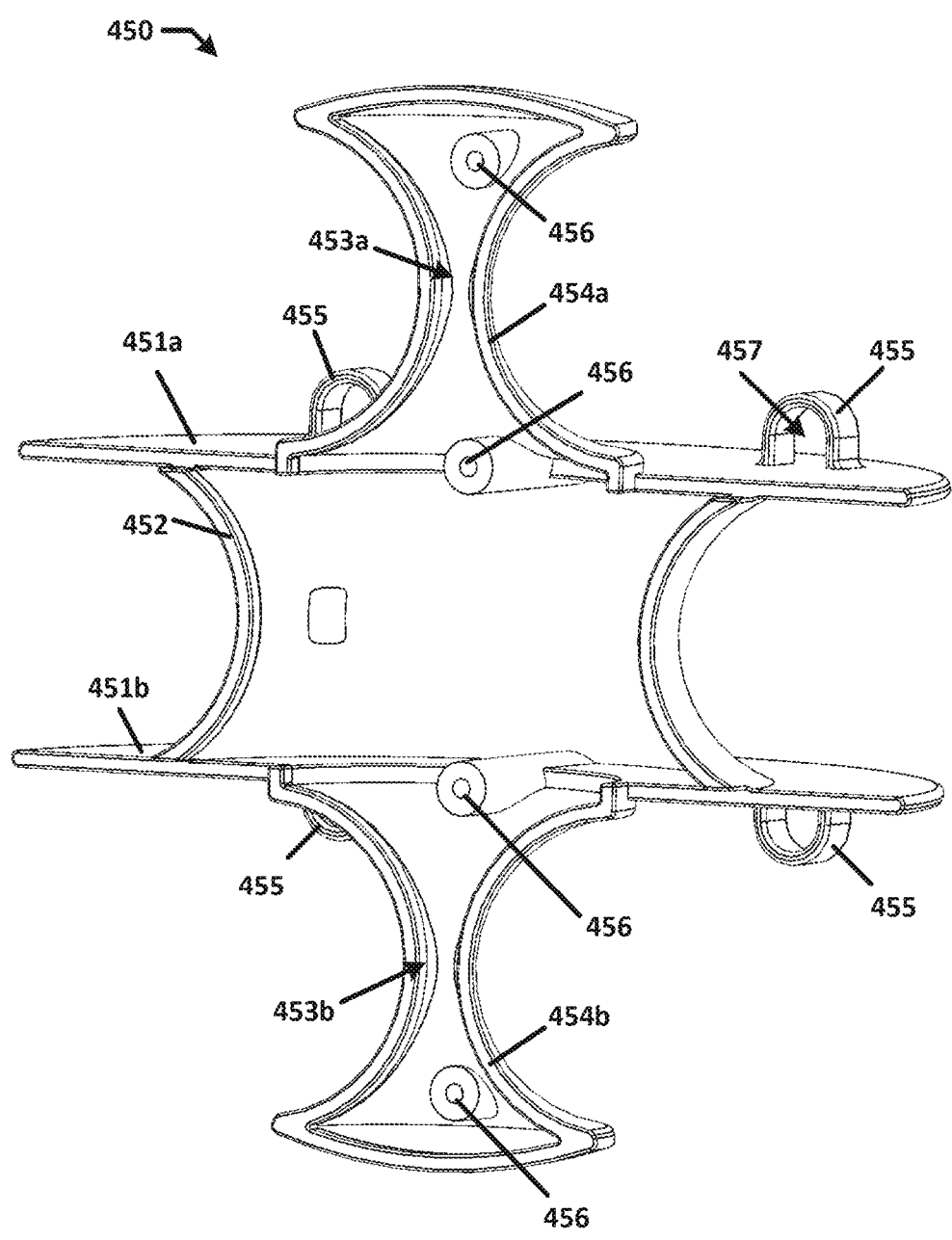
FIG. 14 illustrates an inner core of the pet toy of FIG. 1 in accordance with one example of the present disclosure.

Referring to FIG. 14, an inner core 450 is illustrated in accordance with one example of the present disclosure. As noted above, the first half inner core 250 and the second half inner core 350 may be the same or substantially similar. Accordingly, the inner core 450 shown in FIG. 14 may be the first half inner core 250 and/or the second half inner core 350 as described herein. An inner core 450 may be directly coupled to each of the first half inner hub 240 and the second half inner hub 340.

Referring to FIG. 14, the inner core 450 may include a pair of flanges 451. Specifically, the inner core 450 may include a first flange 451a and a second flange 451b. Each of the flanges 451a, 451b may have a half circle or semicircular shape. Additionally, the first flange 451a and the second flange 451b may be spaced apart from one another and disposed parallel to one another. Each of the first flange 451a and the second flange 451b may be configured to form a boundary surface of one or more tracks 210, 220, 230, 310, 320, 330 included in a respective half (e.g., first half 200, second half 300) of the pet toy 100.

Specifically, in some examples, when the inner core 450 is a first half inner core 250, the first flange 451a and the second flange 451b may each define a boundary surface of the second track 220 included in the first half 200. Similarly, when the inner core 450 is a second half inner core 350, the first flange 451a and the second flange 451b may each define a boundary surface of the fifth track 320 included in the second half 300.

Referring to FIG. 14, the inner core 450 may further include a center wall 452 extending between the first flange 451a and the second flange 451b. In some examples, the center wall 452 may have an arcuate shape corresponding to a shape of the first flange 451a and the second flange 451b. Specifically, the center wall 452 may be set back from a periphery of the first flange 451a and the second flange 451b but have a semicircular shape corresponding to the periphery of the first flange 451a and the second flange 451b, albeit with a smaller radius (as seen in FIGS. 10 and 12). Additionally, in some examples, the center wall 452 may have a concave shape, as shown by the arcuate, concaved ends of the center wall 452 shown in FIG. 14. Specifically, a vertical center of the center wall 452 may be disposed a furthest distance (e.g., horizontally) away from a boundary of the inner core 450 extending between an outer periphery of the first flange 451a and the second flange 451b. In other words, the radius of curvature of the center wall 452 is smallest at its center and largest at its outer peripheries (i.e., an hourglass shape).

Referring to FIG. 14, the inner core 450 may further include a pair of towers 453. Specifically, the inner core 450 may include a first tower 453a and a second tower 453b. Each of the pair of towers 453 may extend or protrude, for example, perpendicularly, from a corresponding flange 451 included in the inner core 450. Each of the pair of towers 453 may extend or protrude from a corresponding flange 451 on a side opposite of the center wall 452 extending between the pair of flanges 451.

Specifically, in some examples, as illustrated in FIG. 14, the first tower 453a may extend or protrude from the first flange 451a of the inner core 450. In some examples, the first tower 453a may include first tower wall 454a. In some examples, the first tower wall 454a may have an arcuate shape corresponding to a shape of the first flange 451a and the second flange 452b. Specifically, the first tower wall 454a may be set back from a periphery of the first flange 451a but have a semicircular shape corresponding to the periphery of the first flange 451a, albeit with a smaller radius (as seen in FIGS. 10 and 12). Additionally, in some examples, the first tower wall 454a may have concave shape. Specifically, a vertical center of the first tower wall 454a may be disposed or set back a furthest distance (e.g., horizontally) from an outer periphery of the first flange 451a. In this way, the first tower wall 454a may have an hourglass shape (as seen in FIGS. 10 and 12). According to some examples of the present disclosure, the first tower wall 454a may define a boundary surface of one or more tracks included in a respective half of the pet toy 100. Specifically, when the inner core 450 is a first half inner core 250, the first tower wall 454a may define a boundary surface of the first track 210. Similarly, when the inner core 450 is a second half inner core 350, the first tower wall 454a may define a boundary surface of the fourth track 310.

In some examples, as illustrated in FIG. 14, the second tower 453b may extend or protrude from the second flange 451b of the inner core 450. In some examples, the second tower 453b may include a second tower wall 454b. In some examples, the second tower wall 454b may have an arcuate shape corresponding to a shape of the first flange 451a and the second flange 452b. Specifically, the second tower wall 454b may be set back from a periphery of the second flange 451b but have a semicircular shape corresponding to the periphery of the second flange 451b, albeit with a smaller radius (as seen in FIGS. 10 and 12). Additionally, in some examples, the second tower wall 454b may have concave shape. Specifically, a vertical center of the second tower wall 454b may be disposed or set back a furthest distance (e.g., horizontally) from an outer periphery of the second flange 451b. In this way, the second tower wall 454b may have an hourglass shape (as seen in FIGS. 10 and 12). According to some examples of the present disclosure, the second tower wall 454b may define a boundary surface of one or more tracks included in a respective half of the pet toy 100. Specifically, when the inner core 450 is a first half inner core 250, the second tower wall 454b may define a boundary surface of the third track 230. Similarly, when the inner core 450 is a second half inner core 350, the second tower wall 454b may define a boundary surface of the sixth track 330.

Referring to FIG. 14, in some examples, the inner core 450 may further include a plurality of shell braces 455. Each of the shell braces 455 may be disposed on one of the pair of flanges 451a, 451b. The shell brace 455 and the flange 451 on which the shell brace 455 is disposed may collectively form an opening 457 configured to receive a portion of an outer shell 460, coupling the outer shell 460 to the inner core 450. In some examples, two or more shell braces 455 may be used to couple the outer shell 460 to the inner core 450. In some examples, each of the shell braces 455 may have a u-shape. In other examples, the shell braces 455 may have another shape.

Still referring to FIG. 14, in some examples, the inner core 450 may include one or more hub mounting holes 456. Each of the hub mounting holes 456 may be configured to receive a fastener 201, 301 for coupling the inner core 450 to the inner hub 440 (i.e., first half inner hub 240, second half inner hub 340). Specifically, a fastener 201, 301 may be inserted through a core mounting hole 242, 342 included in the inner hub 240, 340 and into a corresponding hub mounting hole 456. The same number of core mounting holes 242, 342 and hub mounting holes 456 may be provided. For example, four core mounting holes 242, 342 and four hub mounting holes 456 may be provided. In some examples, a hub mounting hole 456 may be included in each of the pair of towers 453a, 453b. In some examples, the hub mounting holes 456 may have a linear arrangement.

Figure 15:
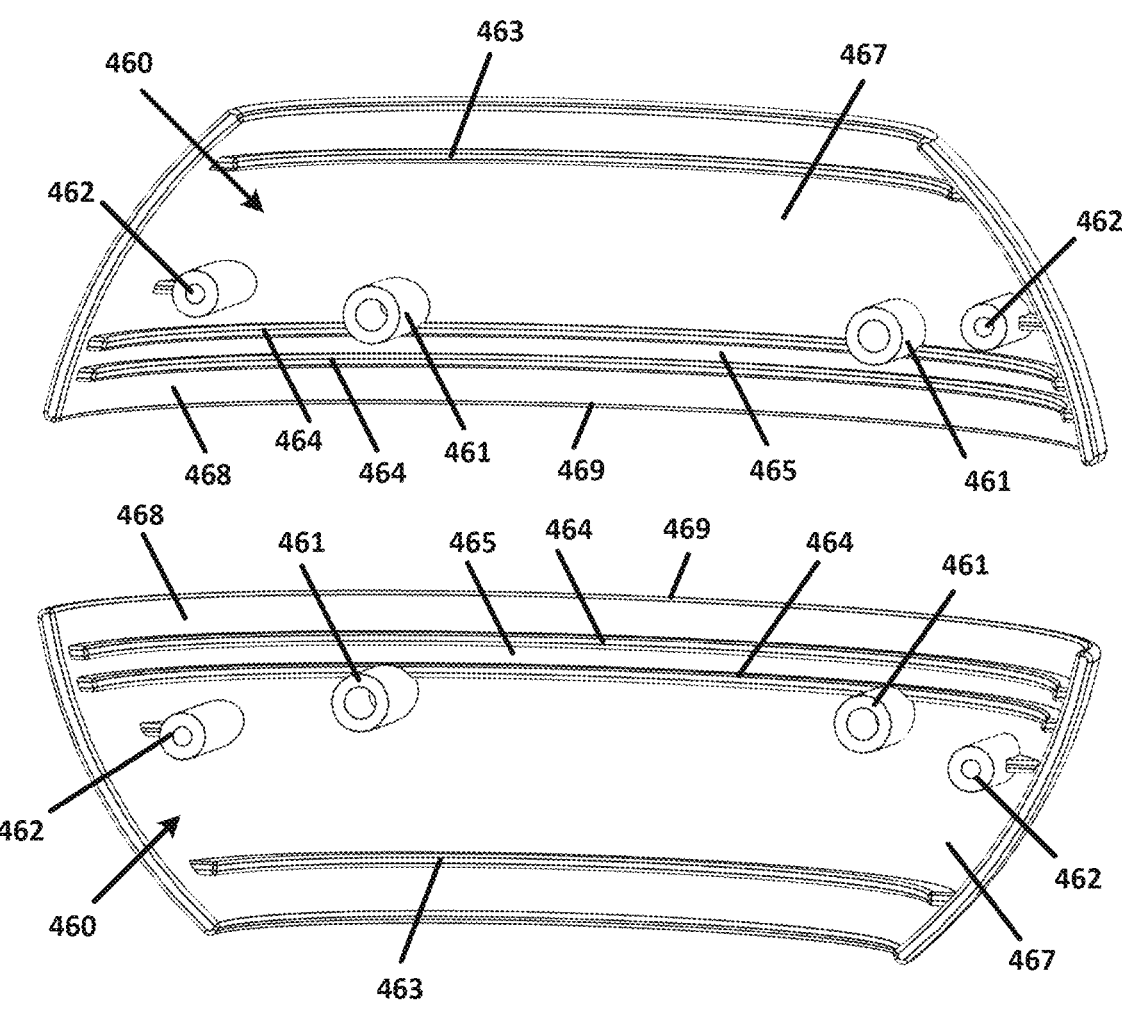
FIG. 15 illustrates a pair of outer shells of the pet toy of FIG. 1 in accordance with one example of the present disclosure.

Referring to FIG. 15, a pair of outer shells 460 is illustrated in accordance with one example of the present disclosure. As noted above, the pair of first half outer shells 260 and the pair of second half outer shells 360 may be the same. Accordingly, the pair of outer shells 460 may be the first half outer shells 260 and/or the second half outer shells 360.

Referring to FIG. 15, each of the pair of outer shells 460 may include a pair of core coupling pins 461, a pair of hub coupling pins 462, a track part rib 463, and a pair of flange ribs 464 forming a flange groove 465. Each of the pair of outer shells 460 may be coupled to the inner core 450 and the inner hub 440 (i.e., first half inner hub 240, second half inner hub 340). The pair of outer shells 460 may be coupled to the inner core 450 and the inner hub 240, 340 in different orientations. Specifically, as illustrated in FIGS. 10, 12, and 13, one of the pair of outer shells 460 may be inverted (e.g., flipped upside down) relative to the other of the pair of outer shells 460 when the pair of outer shells 460 are coupled to the inner hub 440 (i.e., first half inner hub 240, second half inner hub 340) and the inner core 450.

As shown in FIG. 15, each of the pair of outer shells 460 may include a pair of core coupling pins 461. Each of the pair of core coupling pins 461 may extend or protrude from an inner surface 467 of the outer shell 460. Each core coupling pin 461 may be inserted through an opening 457 formed by a flange 451a, 451b and a shell brace 455 of the inner core 450, coupling the outer shell 460 and the inner core 450. In some examples, as illustrated in FIG. 15, the core coupling pins 461 may have a cylindrical shape. However, the present disclosure is not limited thereto. For example, the core coupling pins 461 may have a parallel-epiped shape.

Additionally, as shown in FIG. 15, each of the pair of outer shells 460 may further include a pair of hub coupling pins 462. Each hub coupling pin 462 may extend from the inner surface 467 of the outer shell 460. Each hub coupling pin 462 may be inserted into a shell receptacle 244, 344 included in the inner hub 440 (i.e., first half inner hub 240, second half inner hub 340), coupling the outer shell 460 to the to the inner hub 240, 340. In some examples, as illustrated in FIG. 15, the hub coupling pins 462 may have a cylindrical shape. However, the present disclosure is not limited thereto. For example, the hub coupling pins 462 may have a parallelepiped shape. A shape of the hub coupling pins 462 may correspond to a shape of the channel included in the shell receptacle 244, 344.

Still referring to FIG. 15, each of the pair of outer shells 460 may include a track part rib 463. The track part rib 463 may extend from the inner surface 467 of the outer shell 460. The track part rib 463 is configured to engage (e.g., contact, abut) one of the pair of track parts 470 disposed between the outer shell 460 and the inner hub 440 (i.e., first half inner hub 240, second half inner hub 340). The track part rib 463 may be configured to control or maintain a position of the track part 470 between the outer shell 460 and the inner hub 240, 340.

As shown in FIG. 15, in some examples, the outer shell 460 may further include a pair of flange ribs 464 forming a flange groove 465. Each of the flange ribs 464 may extend from the inner surface 467 of the outer shell 460. The pair of flange ribs 464 may be spaced apart from one another so as to form a flange groove 465 between the pair of flange ribs 464. The flange groove 465 may be configured to receive a portion (e.g., a periphery) of a flange (i.e., first flange 451a, second flange 451b) when the outer shell 460 is coupled to the inner core 450. Accordingly, the flange groove 465 and a flange 451a, 451b disposed within the flange groove 465 may control an arrangement of the outer shell 460 and the inner core 450 relative to one another.

In some examples, the inner surface 467 of the outer shell 460 may define a boundary surface of a track included in the first half 200 or the second half 300, respectively. Specifically, a portion 468 of the inner surface 467 disposed between the pair of flange ribs 464 and an edge 469 of the shell may define a boundary surface of a track included in the first half 200 or the second half, respectively. For example, the portion 468 of the inner surface 467 may define a boundary surface of the second track 220 included in the first half 200 and/or a boundary surface of the fifth track 320 included in the second half 300.

Figure 16:
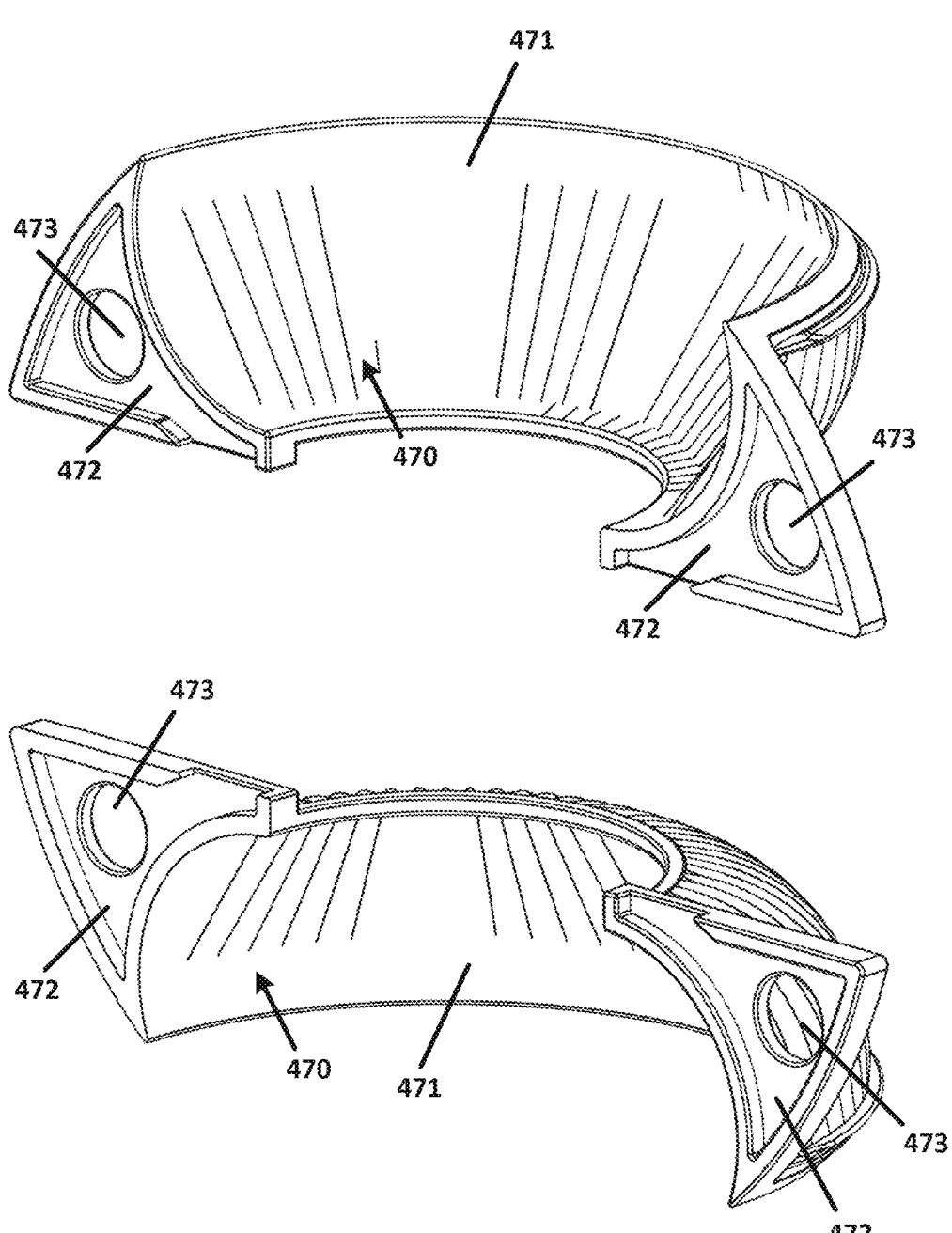
FIG. 16 illustrates a pair of track parts of the pet toy of FIG. 1 in accordance with one example of the present disclosure.

Referring to FIG. 16, a pair of track parts 470 is illustrated in accordance with one example of the present disclosure. As noted above, the pair of first half track parts 270 and the pair of second half track parts 370 may be the same. Accordingly, the pair of track parts 470 may be the pair of first half track parts 270 and/or the pair of second half track parts 370.

Referring to FIG. 16, each of the pair of track parts 470 may include a curved surface 471, a pair of connecting tabs 472, and a pair of hub coupling holes 473. Each of the track parts 470 may be coupled to the inner hub 440 (i.e., first half inner hub 240, second half inner hub 340) and one of the pair of outer shells 460. The pair of track parts 470 may be coupled to the inner hub 240, 340 in different orientations. Specifically, as illustrated in FIGS. 10, 12, and 16, one of the pair of track parts 470 may be inverted (e.g., flipped upside down) relative to the other of the pair of track parts 470 when the pair of track parts 470 are coupled to the inner hub 240, 340.

As shown in FIG. 16, each track part 470 may include a curved surface 471. When the track part 470 is coupled to an inner hub 240, 340 (and a corresponding outer shell 460), the curved surface 471 may define a boundary surface of a track included in the first half 200 or the second half 300. Specifically, the curved surface 471 may define a boundary surface of the first track 210 or the third track 230 included in the first half 200. Similarly, the curved surface 471 may define a boundary surface of the fourth track 310 or the sixth track 330 included in the second half 300. Each track part 470 included in the pet toy 100 may define a boundary surface of a different one of the first track 210, third track 230, fourth track 310 and sixth track 330.

Still referring to FIG. 16, each track part 470 may include a pair of connecting tabs 472 extending or protruding from a body of the track part 470. Each track part 470 may further include a pair of hub coupling holes 473. In some examples, one of the pair of hub coupling holes 473 may be disposed on each of the connecting tabs 472. Each of hub coupling holes 473 may be configured to receive a shell receptacle 244, 344 included in the inner hub 240, 340. The hub coupling holes 473 may be configured to circumscribe the shell receptacle 244, 344 coupling the track part 470 to the inner hub 240, 340. In some examples, two or more hub coupling holes 473 and two or more shell receptacle 244 may be used to couple each track part 470 to the inner hub 240, 340. For example, as illustrated in FIG. 10, two hub coupling holes 473 and two shell receptacles 244, 344 may couple the track part 470 and the inner hub 240, 340.

Referring generally to the figures, the first track 210 may be defined by the first half inner core 250 and one of the pair of first half track parts 270. Specifically, the first track 210 may be defined by the first tower wall 454a and the curved surface 471 of the track part 470. Further, the second track 220 may be defined by the first half inner core 250 and the pair of first half outer shells 260. Specifically, the second track 220 may be defined by first flange 451a, center wall 452, second flange 451b, and the portion 468 of each of the pair of first half outer shells 260. Additionally, the third track 230 may be defined by the first half inner core 250 and one of the pair of first half track parts 270. Specifically, the third track 230 may be defined by the second tower wall 454b and the curved surface 471 of the track part 470.

Still referring generally to the figures, the fourth track 310 may be defined by the second half inner core 350 and one of the pair of second half track parts 370. Specifically, the fourth track 310 may be defined by the first tower wall 454a and the curved surface 471 of the track part 470. Additionally, the fifth track 320 may be defined by the second half inner core 350 and the pair of second half outer shells 360. Specifically, the fifth track 320 may be defined by the first flange 451a, the center wall 452, the second flange 451b, and the portion 468 of each of the pair of second half outer shells 360. Further, the sixth track 330 may be defined by the second half inner core 350 and one of the pair of second half track parts 370. Specifically, the sixth track 330 may be defined by the second tower wall 454b and the curved surface 471 of the track part 470.

Figure 17:
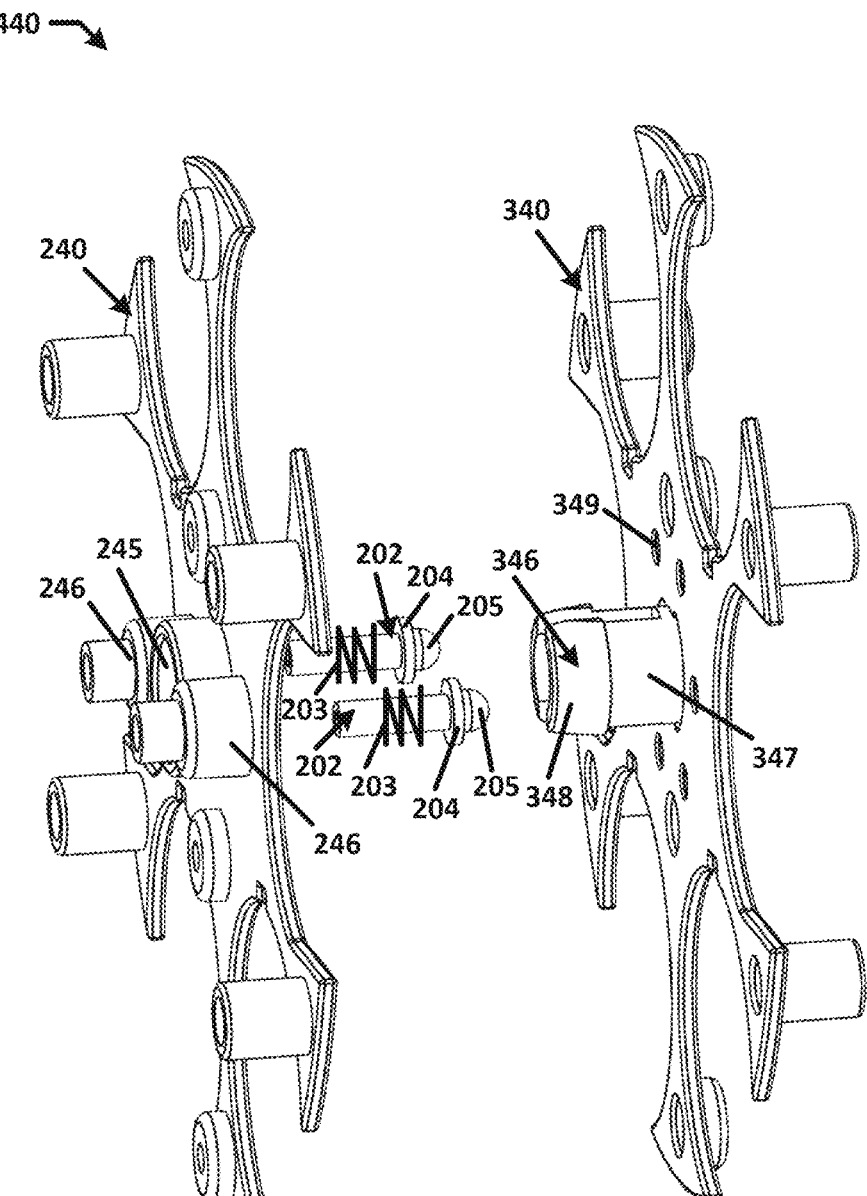
FIG. 17 illustrates a partial exploded view of the inner hub of the pet toy of FIG. 1 in accordance with one example of the present disclosure.

Referring to FIG. 17, a partial exploded view of the inner hub of the pet toy 100 is illustrated in accordance with one example of the present disclosure. Specifically, FIG. 17 illustrates the first half inner hub 240 and the second half inner hub 340. The first half inner hub 240 and the second half inner hub 340 may be rotatably coupled to one another. According to some examples of the present disclosure, an interface between the first half inner hub 240 and the second half inner hub 340 may facilitate rotation between the first half 200 and the second half 300 (e.g., the pair of track modules 200, 300). Referring to FIG. 17, the first half coupling hole 245 and the second half coupling projection 346 may be disposed in a center of the first half inner hub 240 and the second half inner hub 340, respectively. Additionally, as described above, the first half coupling hole 245 may have a circular shape and the second half coupling projection 346 may have a cylindrical shape, such that when the second half coupling projection 346 extends through the first half coupling hole 245, the first half inner hub 240 and the second half inner hub 340 (and thus the first half 200 and the second half 300) may be coupled to one another and free to rotate with respect to one another about the second half coupling projection 346.

As noted above, in some examples, the second half coupling projection 346 may include a pair of protrusions 347 and each of the protrusions 347 may include a barb 348 at a distal end thereof. As noted above, the protrusions 347 may be configured to elastically deform so that the barbs 348 may pass through the first half coupling hole 245. After the barbs 348 have been inserted through the first half coupling hole 245, the barbs 348 may engage (e.g., abut, contact) the first half inner hub 240, preventing the second half coupling projection 346 (and thus the second half inner hub 340) from being removed from the first half inner hub 240.

Additionally, as noted above and illustrated in FIG. 17, the first half inner hub 240 may include a pair of pin sockets 246 configured to hold (e.g., contain, house, store) a pin 202 and a biasing member 203. As illustrated in FIG. 17, each pin 202 may include a pin flange 204 and a pin head 205. As shown in FIG. 17, the biasing member 203 may be disposed between the pin socket 246 and the pin flange 204 and may be configured to bias the pin 202 away from the first half inner hub 240. Further, as noted above and illustrated in FIG. 17, the second half inner hub 340 may include a plurality of detents 349 configured to receive a portion of the pin 202. Specifically, each detent 349 may be configured to receive a pin head 205. As noted above a position of the detents 349 may correspond to the multiple arrangements of the first half 200 and the second half 300 (e.g., pair of track modules 200, 300) relative to one another. Specifically, the pair of pins 202 included in the first half inner hub 240 may align with two of the detents 349 included in the second half inner hub 340 in each of the multiple arrangements of the first half 200 and the second half 300 relative to one another. Accordingly, when the first half 200 and the second half 300 are disposed in one of the multiple arrangements relative to one another, such that the pin heads 205 are disposed in detents 349 included in the second half inner hub 340, the pin heads 205 and detents 349 may resist rotational movement of the first half 200 and the second half 300 relative to one another. Accordingly, rotational force exceeding a predetermined threshold must be applied to the first half 200 and/or the second half 300, causing the biasing member 203 to compress, which allows the pin heads 205 to withdraw from the detents 349 before the first half 200 and the second half 300 may be rotated from one of the multiple arrangements to another of the multiple arrangements.

Figure 18:
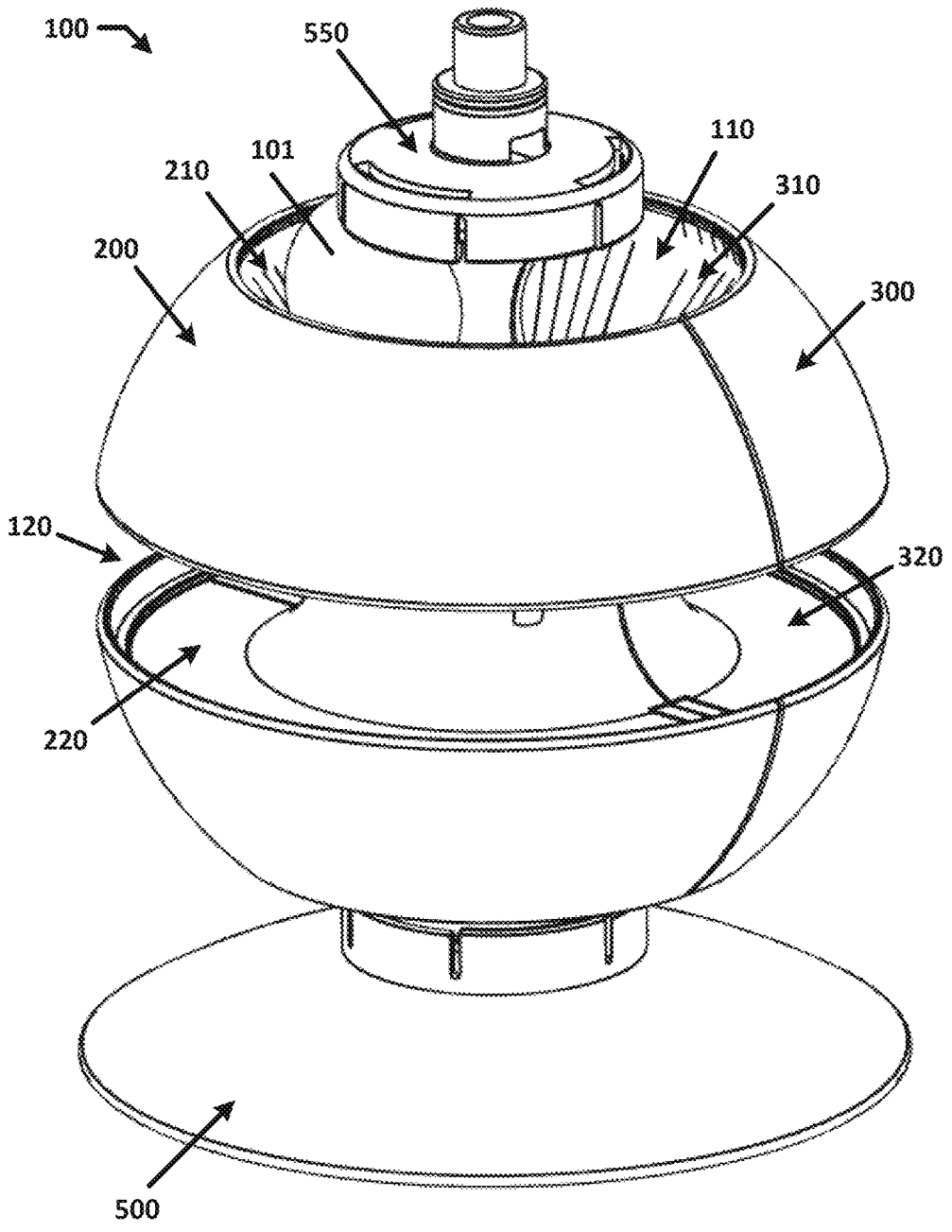
FIG. 18 illustrates a perspective view of a pet toy in accordance with one example of the present disclosure.

Referring to FIG. 18, a perspective view of the pet toy 100 is illustrated in accordance with one example of the present disclosure. As shown in FIG. 18, the pet toy 100 may further include a base 500 and a topper 550. As illustrated in FIG. 18, each of the base 500 and the topper 550 may be coupled to one of the towers 453a, 453b of the first half inner core 250 and one of the towers 453a, 453b of the second half inner core 350. Specifically, the base 500 and/or the topper 550 may be coupled to the first half 200 and the second half 300, when the towers 453a, 453b included in the first half inner core 250 and the second half inner core 350 are aligned (e.g., disposed adjacent to one another). For example, the base 500 and/or the topper 550 may be coupled to the first half 200 and the second half 300 when the first half 200 and the second half 300 are in the first arrangement as illustrated in FIGS. 1-3 and 18 and the fourth arrangement illustrated in FIG. 6. When the base 500 and/or the topper 550 are coupled to the first half 200 and the second half 300, the base 500 and/or topper 550 may prevent the first half 200 and the second half 300 from rotating relative to one another, locking or maintaining a position or arrangement of the first half 200 and second half 300 relative to one another.

Figure 19:
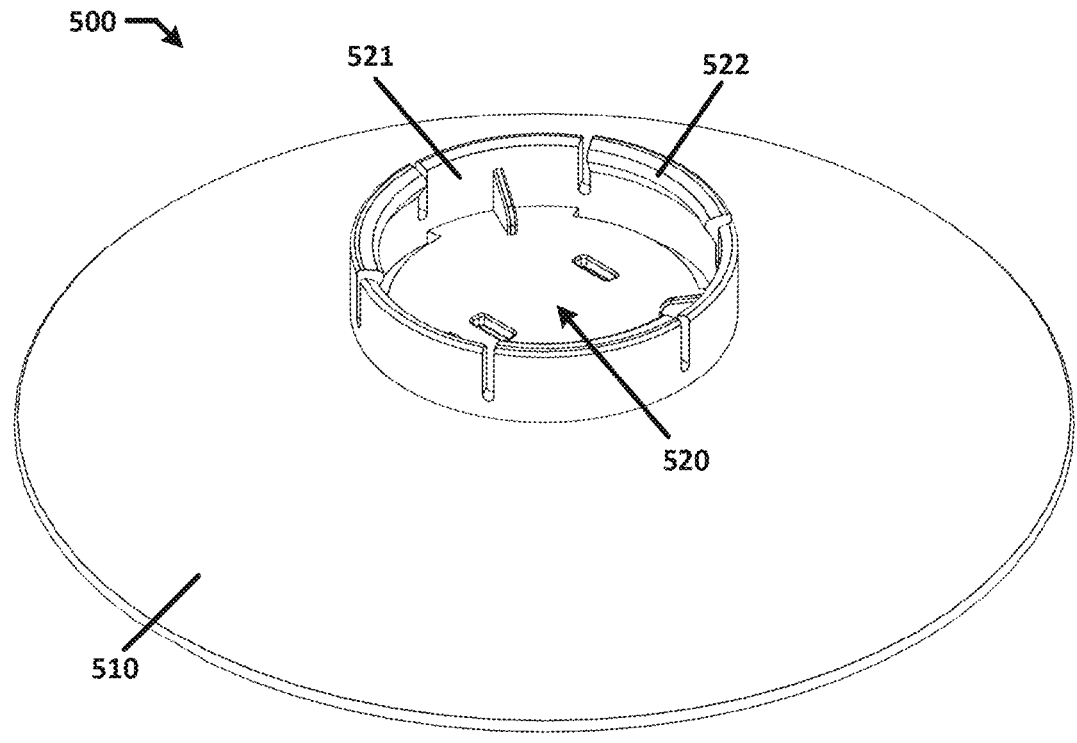
FIG. 19 illustrates a perspective view of a base of the pet toy of FIG. 18 according to one example of the present disclosure.

Referring to FIG. 19, a base 500 of the pet toy 100 described above is illustrated in accordance with one example of the present disclosure. As shown in FIG. 19, the base 500 includes a base body 510 and a cavity 520. The base body 510 may be configured to stably support a first half 200 and second half 300 of the pet toy 100 in an upright or vertical position. Specifically, the base body 510 may be configured to contact a surface on which the base 500 is disposed and stably support the first half 200 and the second half 300 in the upright position. In some examples, as illustrated in FIG. 19, the base body 510 may have a circular shape. The base body 510 may be configured to withstand the force of animals playing (e.g., batting, grasping) with the pet toy 100 while still maintaining the first half 200 and the second half 300 of the pet toy 100 in an upright orientation. Specifically, in some examples, the base body 510 may be sufficiently large or have a sufficient number of contact points with a surface on which the base body 510 is placed so as to stably support the first half 200 and the second half 300 of the pet toy 100.

Additionally, as shown in FIG. 19, the base 500 includes a cavity 520 (e.g., base cavity 520). The cavity 520 may be configured to receive a tower 453a, 453b included in the first half inner core 250 (e.g., first half 200) and a tower 453a, 453b included in the second half inner core 350 (e.g., second half 300), coupling the first half 200 and the second half 300 to the base 500. In some examples, the base 500 may include a circular wall 521 extending from the base body 510. The circular wall 521 and base body 510 may define the boundaries of the cavity 520. In some examples, the circular wall

521 may include one or more locking flanges 522 (e.g., base locking flanges 522) configured to maintain a position of one of the towers 453a, 453b included in the first half 200 and one of the towers 453a, 453b included in the second half 300 within the cavity 520.

Figure 20:
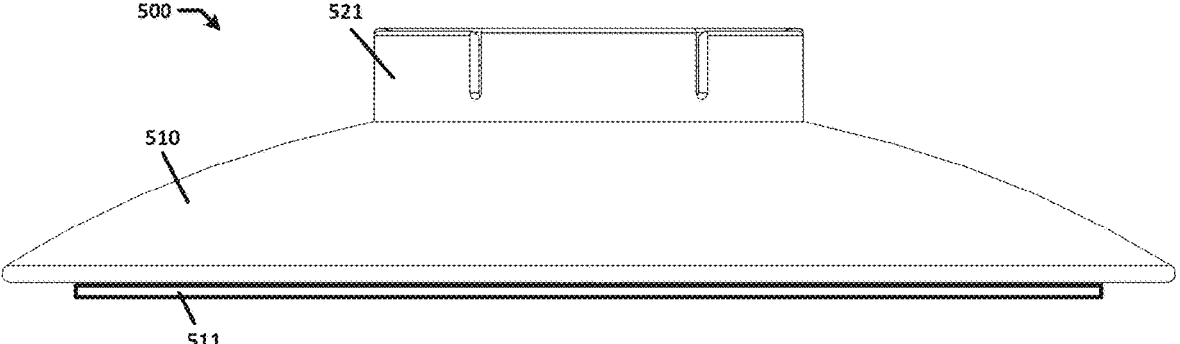
FIG. 20 illustrates a side view of the base of FIG. 19 in accordance with one example of the present disclosure.

Referring to FIG. 20, a side view of the base 500 of FIG. 19 is illustrated in accordance with one example of the present disclosure. According to some examples of the present disclosure, as illustrated in FIG. 20, the base 500 may further include one or more feet 511 configured to provide stability and/or prevent the base 500 from slipping or sliding relative to a surface on which the base 500 is disposed. As illustrated in FIG. 20, the one or more feet may be disposed on (e.g., coupled to) a bottom surface of the base body 510. According to some examples, the one or more feet 511 may be composed of rubber or a similar material. In some examples, as illustrated in FIG. 20, the base 500 may include a single foot 511; however, the present disclosure is not limited thereto. Any number of feet 511 may be included. For example, the base 500 may include one, two, three, four, or more than four feet 511.

Figure 21:
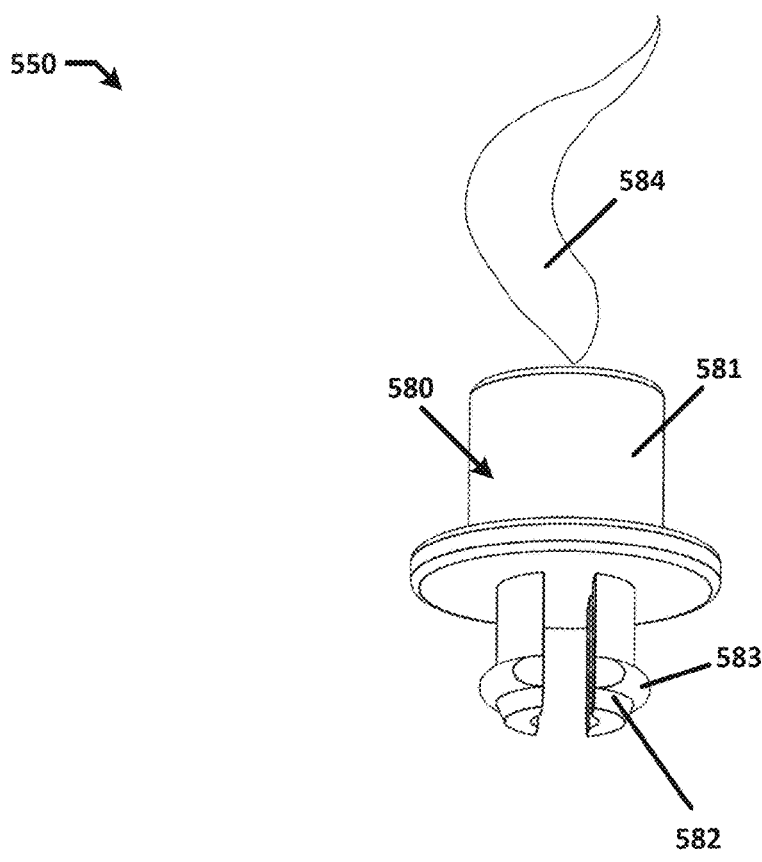
FIG. 21 illustrates a perspective view of a topper of the pet toy of FIG. 18 according to one example of the present disclosure.
Figure 21:
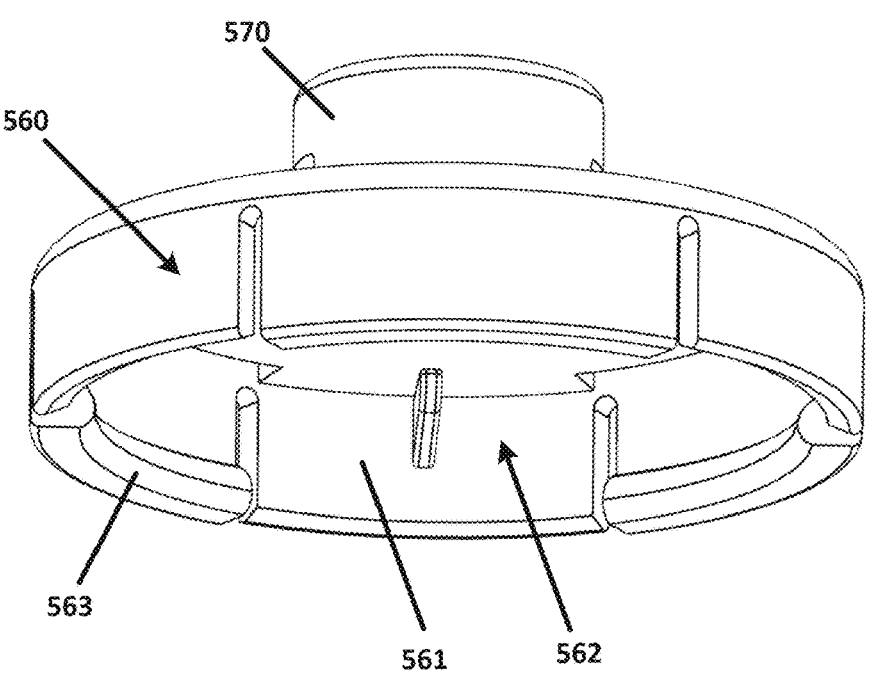

Referring to FIG. 21, a topper 550 is illustrated in accordance with one example of the present disclosure. As shown in FIG. 21, the topper 550 may include a topper body 560 including a circumferential wall 561 configured to define a cavity 562 (e.g., topper cavity 562) configured to receive a tower 453a, 453b included in the first half inner core 250 (e.g., first half 200) and a tower 453a, 453b included in the second half inner core 350 (e.g., second half), coupling the first half 200 and the second half 300 to the topper 550. Further, in some examples, as shown in FIG. 21, the circumferential wall 561 may include one or more flanges 563 (e.g., topper locking flanges 563) configured to maintain a position of one of the towers 453a, 453b included in the first half 200 and one of the towers 453a, 453b included in the second half 300 within the cavity 562.

As shown in FIG. 21, the topper 550 may further include an accessory receptacle 570 configured to receive an accessory 580. Specifically, the accessory receptacle 570 may be configured to receive a portion of an accessory 580 to be coupled to the topper 550. In some examples, the accessory receptacle 570 may be designed or configured such that a plurality of accessories may be interchangeably coupled to the topper body 560 (via the accessory receptacle 570). As shown in FIG. 21, the accessory 580 may include an accessory body 581 and a pair of locking tabs 582 (e.g., accessory locking tabs 582) configured to be inserted into the accessory receptacle 570, coupling the accessory 580 to the topper 550. In some examples, each of the pair of locking tabs 582 may include a ridge 583 configured to engage an inner surface of the accessory receptacle 570, maintaining a position of the accessory 580 relative to the accessory receptacle 570. The accessory 580 may further include an end assembly 584 extending or protruding from the accessory body 581. The end assembly 584 may include a lure or attractant (e.g., feather, string, ball), a flexible elongate member extending from the accessory body 581, a flexible elongate member extending from the accessory boy 581 and including a lure or attractant, or the like. The lure or attractance may be a feather, faux fur, a ball, a string, a bunch of feathers or strings, a plush toy, a plastic or otherwise chewable toy, or any combination thereof. In some examples, the end assembly 584 may include a spring and/or electrical motor configured facilitate movement of the end assembly 584. A power source, such as batteries, may be disposed in the accessory body 581 or topper body 560 to power the electric motor.

While the present disclosure has been described with reference to specific examples, which are intended to be illustrative only and not to be limiting of the disclosure, it should be apparent to those of ordinary skill in the art that changes, additions and/or deletions may be made to the disclosed embodiments without departing from the spirit and scope of the disclosure.

The foregoing description is given for clarity of understanding only, and no unnecessary limitations should be understood therefrom, as modifications within the scope of the disclosure may be apparent to those having ordinary skill in the art.

When a component, device, element, or the like of the present disclosure is described as having a purpose or performing an operation, function, or the like, the component, device, or element, should be considered herein as being "configured to" meet that purpose or perform that operation or function.

What is claimed is:

1. A pet toy comprising:
   a first half; and
   a second half rotatably coupled to the first half,
   wherein in a first arrangement, the first half and the second half collectively form two or more independent pathways, each of the two or more independent pathways configured to receive and convey an object,
   wherein in a second arrangement, the first half and the second half collectively form a single pathway configured to receive and convey the object, and
   wherein each of the first half and the second half include
   an inner hub including a plurality of spokes, and
   a pair of track parts, each of the pair of track parts defining a boundary surface of a respective one of a plurality of tracks, the plurality of tracks forming part of one of the two or more independent pathways in the first arrangement and part of the single pathway in the second arrangement,
   wherein the pair of track parts are directly coupled to a respective one of the plurality of spokes.

2. The pet toy of claim 1, wherein the first half and the second half are configured to rotate relative to one another between the first arrangement and the second arrangement.

3. The pet toy of claim 1, wherein the object is a ball.

4. The pet toy of claim 1, wherein the first half includes a first track, a second track, and a third track; and
   wherein the second half includes a fourth track, a fifth track, and a sixth track.

5. The pet toy of claim 4, wherein in the first arrangement, the first track and the fourth track collectively form a first pathway, the second track and the fifth track collectively form a second pathway, and the third track and the sixth track collectively form a third pathway; and
   wherein in the second arrangement, the first track, second track, third track, fourth track, fifth track, and sixth track collectively form a fourth pathway.

6. The pet toy of claim 4, wherein each of the first half and the second half further comprises:
   an inner core coupled to the inner hub; and
   a pair of outer shells,
   wherein each of the track parts is disposed between the inner core and one of the pair of outer shells.

7. The pet toy of claim 6, wherein the inner core of each of the first half and the second half includes:
   a pair of flanges having a semicircular shape;
   a center wall extending between the pair of flanges; and
   a pair of towers.

8. The pet toy of claim 1, further comprising a base coupled to the first half and the second half and configured to support the first half and the second half in an upright position.

9. The pet toy of claim 1, further comprising:

a topper including an end assembly configured to be coupled to the first half and the second half.

10. The pet toy of claim 1, wherein each of the pair of track parts includes a connecting tab and a hub coupling hole configured to receive a portion of the inner hub extending through the connecting tab.

11. A pet toy comprising:

a pair of track modules coupled to one another, each of the pair of track modules including:

an inner hub including a plurality of spokes; and a pair of track parts, each of the pair of track parts defining a boundary surface of a respective one of a plurality of tracks, the pair of track parts being directly coupled to a respective one of the plurality of spokes, wherein in a first arrangement the pair of track modules collectively form two or more independent pathways, each of the two or more independent pathways configured to receive and convey an object, wherein in a second arrangement the pair of track modules collectively form a single pathway configured to receive and convey the object, and wherein the plurality of tracks form part of one of the two or more independent pathways in the first arrangement and part of the single pathway in the second arrangement.

12. The pet toy of claim 11, wherein the pair of track modules are rotatably coupled and configured to rotate relative to one another between the first arrangement and the second arrangement.

13. The pet toy of claim 11, wherein the object has a sphere shape.

14. The pet toy of claim 11, wherein each of the pair of track modules includes three tracks.

15. The pet toy of claim 14, wherein in the first arrangement the pair of track modules collectively form three independent pathways.

16. The pet toy of claim 11, wherein each of the pair of track modules comprises:

an inner core coupled to the inner hub; and a pair of outer shells, wherein each of the pair of track modules is disposed between the inner core and one of the pair of outer shells.

17. A pet toy comprising:

a pair of track modules coupled to one another, each of the pair of track modules including:

an inner hub including a plurality of spokes; and a pair of track parts, each of the pair of track parts defining a boundary surface of a respective one of a plurality of tracks, the pair of track parts being directly coupled to a respective one of the plurality of spokes; and a base configured to support the pair of track modules in an upright position coupled to the pair of track modules, wherein in a first arrangement the pair of track modules collectively form two or more independent pathways, each of the two or more independent pathways configured to receive and convey an object, wherein in a second arrangement the pair of track modules collectively form a single pathway configured to receive and convey the object, wherein the plurality of tracks form part of the two or more independent pathways in the first arrangement and part of the single pathway in the second arrangement.

18. The pet toy of claim 17, wherein each of the pair of track modules includes a first tower and a second tower, and wherein the base includes a base cavity configured to receive one of the first tower and the second tower included in one of the pair of track modules and one of the first tower and the second tower included in another of the pair of track modules, thereby coupling the base to the pair of track modules.

19. The pet toy of claim 17, further comprising:

a topper including an end assembly coupled to the pair of track modules, wherein each of the pair of track modules includes a first tower and a second tower, and wherein the topper includes a topper cavity configured to receive one of the first tower and the second tower included in one of the pair of track modules and one of the first tower and the second tower included in another of the pair of track modules, coupling the topper to the pair of track modules.

20. The pet toy of claim 17, wherein each of the pair of track modules includes three tracks, and wherein in the first arrangement the pair of track modules collectively form three pathways.

\* \* \* \* \*